US012592870B2

(12) United States Patent
Peng et al.

(10) Patent No.: US 12,592,870 B2
(45) Date of Patent: Mar. 31, 2026

(54) COMMUNICATION METHOD AND RELATED DEVICE

(71) Applicant: HUAWEI TECHNOLOGIES CO., LTD., Guangdong (CN)

(72) Inventors: Tao Peng, Shenzhen (CN); Huirong Shi, Shenzhen (CN); Yinye Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 530 days.

(21) Appl. No.: 17/976,052

(22) Filed: Oct. 28, 2022

(65) Prior Publication Data

US 2023/0050466 A1      Feb. 16, 2023

Related U.S. Application Data

(63) Continuation of application No. PCT/CN2021/086928, filed on Apr. 13, 2021.

(30) Foreign Application Priority Data

Apr. 30, 2020    (CN) .......................... 202010365472.2

(51) Int. Cl.
*H04L 41/5019*      (2022.01)
*H04L 45/76*        (2022.01)
*H04L 47/122*       (2022.01)

(52) U.S. Cl.
CPC .......... *H04L 41/5019* (2013.01); *H04L 45/76* (2022.05); *H04L 47/122* (2013.01)

(58) Field of Classification Search
CPC ... H04L 41/5019; H04L 45/76; H04L 47/122; H04W 76/12; H04W 76/11; H04W 88/16; H04W 76/10
See application file for complete search history.

(56) References Cited

U.S. PATENT DOCUMENTS

| | | | |
|---|---|---|---|
| 2014/0143428 A1 | 5/2014 | Zheng | |
| 2018/0376338 A1 | 12/2018 | Ashrafi | |
| 2020/0145278 A1* | 5/2020 | Ghadge | .............. H04L 41/0668 |
| 2021/0076257 A1* | 3/2021 | Pocha | .................. H04W 40/22 |
| 2021/0127271 A1* | 4/2021 | Wu | ................. H04W 12/0471 |
| 2021/0329464 A1* | 10/2021 | Xing | .................... H04W 16/02 |

(Continued)

FOREIGN PATENT DOCUMENTS

| | | |
|---|---|---|
| CN | 106559451 A | 4/2017 |
| CN | 106912012 A | 6/2017 |
| CN | 106937271 A | 7/2017 |

(Continued)

*Primary Examiner* — Asad M Nawaz
*Assistant Examiner* — Najeeb Ansari

(57)      ABSTRACT

Embodiments of this application provide a communication method and a related device. In the method, a control plane (CP) sends a first message to a user plane steering function (USF). The first message includes end user information, and indicates the USF to schedule an end user based on the end user information. Then, the CP determines, based on an identifier of a target UP carried in a first request message sent by the USF, to schedule the end user to the target UP. Thus, a scheduling policy of the end user is determined via the USF. The CP further processes a connection between the end user and the target UP based on the identifier of the target UP.

19 Claims, 9 Drawing Sheets

(56) References Cited

U.S. PATENT DOCUMENTS

2024/0259857 A1 * 8/2024 Zhu .................. H04W 28/0263

FOREIGN PATENT DOCUMENTS

| | | | |
|---|---|---|---|
| CN | 109672549 | A | 4/2019 |
| CN | 110999515 | A | 4/2020 |
| JP | 2006245841 | A | 9/2006 |
| KR | 20190017366 | A | 2/2019 |

* cited by examiner

1100

COMMUNICATION METHOD AND RELATED DEVICE

CROSS-REFERENCE TO RELATED APPLICATIONS

This application is a continuation of International Application No. PCT/CN2021/086928, filed on Apr. 13, 2021, which claims priority to Chinese Patent Application No. 202010365472.2, filed on Apr. 30, 2020. The disclosures of the aforementioned applications are hereby incorporated by reference in their entireties.

TECHNICAL FIELD

This application relates to the field of wireless communication, and in particular, to a communication method and a related device.

BACKGROUND

With the development of a software-defined network (SDN) controller technology and a network functions virtualization (NFV) technology, a metropolitan area network evolves from a conventional network-centric architecture to a data center-centric network architecture.

In the current technology, to adapt to the data center-centric network architecture, a conventional network element device also needs to evolve from professional to universal in terms of network functions. As a conventional broadband access gateway device, a broadband network gateway (BNG) is very important in a user broadband access service and scenario. In the BNG, a control plane (CP) entity performs user authentication, access control, user scheduling, and the like on an end user who accesses the BNG device.

However, with development of various internet services, a requirement on a quantity of user sessions supported by a BNG device and a user access bandwidth continuously increase. A requirement on processing performance of a CP in a current BNG device also continuously increases. Consequently, processing load of the CP is excessively heavy, and communication performance is affected.

SUMMARY

Embodiments of this application provide a communication method and a related device, to implement dynamic scheduling of an end user in a broadband network gateway (BNG) device via a user plane steering function entity USF, reduce processing load of a control plane (CP), and improve communication performance.

A first aspect of the embodiments of this application provides a communication method, applied to a control plane (CP). The CP is included in a broadband network gateway (BNG), and the BNG further includes a user plane steering function entity (USF). In the method, the CP sends a first message to the USF, where the first message includes end user information, and the end user information includes user access information and service level agreement SLA information. Then, the CP receives a first request message from the USF, where the first request message includes an identifier of a target UP, and the target UP is associated with an end user, that is, the first request message indicates to schedule the end user based on the target UP. Then, the CP processes a connection between the end user and the target UP based on the identifier of the target UP. The CP sends the first message to the USF. The first message includes the end user information, and indicates the USF to schedule the end user based on the end user information. Then, the CP determines, based on the identifier of the target UP carried in the first request message sent by the USF, to schedule the end user to the target UP. In other words, a scheduling policy of the end user is determined via the USF. Then, the CP further processes the connection between the end user and the target UP based on the identifier of the target UP, so that the scheduling policy of the end user is determined in the BNG device via the USF. This reduces processing load of the control plane CP, and improves communication performance.

In a specific implementation of the first aspect of the embodiments of this application, the CP and the USF may exchange data through a first communication interface. The CP may send the first message to the USF through the first communication interface, and the USF may send the first request message to the CP through the first communication interface.

In this embodiment, the CP and the USF may exchange data through the first communication interface. The first communication interface may include a NETCONF, REST-FUL, or another communication interface, so that the CP and the USF may align, through the first communication interface, content of messages transmitted between the CP and the USF. This improves communication efficiency.

In a specific implementation of the first aspect of the embodiments of this application, the first message may include a first object field, a first operation field, and a first operation attribute field, and the first request message includes a second object field, a second operation field, and a second operation attribute field.

In this embodiment, in a communication interface (for example, the first communication interface) between the CP and the USF, a data model that may be used includes at least three fields, namely, an object field, an operation field, and an operation attribute field. In this case, the first message sent by the CP to the USF and the first message sent by the USF to the CP may each include the at least three fields, so that the CP and the USF may align, based on the at least three fields, content of messages transmitted between the CP and the USF. This improves communication efficiency.

In a specific implementation, the first aspect of the embodiments of this application may be applied to a scenario in which the CP schedules an end user to go online. In this case, in the first message, the first object field includes the user access information and the SLA information, the SLA information includes initial SLA information, and the first operation field includes information whose indication operation type is user online. In the first request message, the second object field includes the user access information, the second operation field includes information whose indication operation type is a first steering request, and the second operation attribute field includes the identifier of the target UP.

In this embodiment, in the communication interface between the CP and the USF, the CP may indicate the to-be-scheduled end user to the USF by using the user access information and the SLA information that are included in the first object field; and indicate, by using the information whose indication operation type is user online included in the first operation field, the USF to schedule the end user to go online. Then, in the communication interface between the USF and the CP, the USF may indicate the currently scheduled end user to the CP by using the user access information in the second object field; indicate, by using the information whose indication operation type is the first steering request included in the second operation field, the CP to perform go-online steering of the end user; and indicate, by using the identifier of the target UP included in the second operation attribute field, the CP to steer the end user to the target UP. This implements scheduling of an online connection of the end user in the BNG.

In a specific implementation, the first aspect of the embodiments of this application may be applied to a scenario in which the CP updates an SLA of an end user. In this case, in the first message, the first object field includes the user access information and the SLA information, the SLA information includes SLA update information, and the first operation field includes information whose indication operation type is user SLA update. In the first request message, the second object field includes the user access information, the second operation field includes information whose indication operation type is a second steering request, and the second operation attribute field includes the identifier of the target UP.

In this embodiment, when the CP updates the SLA of the end user, in the communication interface between the CP and the USF, the CP may indicate the to-be-scheduled end user to the USF by using the user access information and the SLA information that are included in the first object field; and indicate, by using the information whose indication operation type is user SLA update included in the first operation field, the USF to update the SLA of the end user. Then, in the communication interface between the USF and the CP, the USF may indicate the currently scheduled end user to the CP by using the user access information in the second object field; indicate, by using the information whose indication operation type is the second steering request included in the second operation field, the CP to perform steering of the end user based on an updated SLA; and indicate, by using the identifier of the target UP included in the second operation attribute field, the CP to steer the end user to the target UP. This implements scheduling of an online connection of the end user in the BNG.

In a specific implementation of the first aspect of the embodiments of this application, the user access information includes a steering function entity SF identity ID, QinQ information, and an initial user plane entity UP ID.

In this embodiment, different user access information may indicate one or more different end users. The CP may indicate, to the USF by using information such as the steering function entity SF identity ID, the QinQ information, and the initial user plane entity UP ID that are included in the user access information, one or more different end users who need to be scheduled. In this way, the end users who need to be scheduled can be indicated to the USF in a plurality of implementations. This improves implementation flexibility of the solution.

In a specific implementation of the first aspect of the embodiments of this application, the user access information further includes at least one of the following: network segment information, a group UP ID, and an access interface ID.

In this embodiment, the user access information may include the SF ID, the QinQ information, and the initial UP ID. In addition, when the user access information needs to indicate to the USF to schedule a plurality of different end users, the user access information may further include the network segment information, the group UP ID, and the access interface ID, to indicate to the USF to schedule a plurality of different end users corresponding to at least one of the network segment information, the group UP ID, and the access interface ID.

In a specific implementation of the first aspect of the embodiments of this application, that the CP processes a connection between the end user and the target UP based on the identifier of the target UP may specifically include: The CP sends an identifier of the end user to the target UP.

In this embodiment, the CP is configured to schedule a connection between the end user and the BNG. Specifically, in a process in which the CP processes the connection between the end user and the target UP based on the identifier of the target UP, the CP may send the identifier of the end user to the target UP, so that the target UP knows to schedule the end user. This implements dynamic scheduling between the end user and the target UP.

A second aspect of the embodiments of this application provides a communication method, applied to a user plane steering function entity USF. The USF is included in a broadband network gateway BNG, and the BNG further includes a control plane entity CP and a software-defined network SDN controller. In the method, when the CP schedules an end user, the USF receives a first message from the CP, where the first message includes end user information, and the end user information includes user access information and service level agreement SLA information. Then, the USF determines, based on the first message, a target UP associated with the end user, that is, the USF indicates the CP to schedule the end user based on the target UP. Then, the USF sends a first request message to the CP, where the first request message includes an identifier of the target UP. The USF receives the first message from the CP. The first message includes the user access information and the SLA information, and indicates the USF to schedule the end user based on the end user information. Then, the CP may determine, based on the identifier of the target UP carried in the first request message sent by the USF, to schedule the end user to the target UP, so that dynamic scheduling of the end user is implemented in the BNG device via the USF. This reduces processing load of the control plane entity CP, and improves communication performance.

In a specific implementation of the second aspect of the embodiments of this application, the CP and the USF may exchange data through a first communication interface. The CP may send the first message to the USF through the first communication interface, and the USF may send the first request message to the CP through the first communication interface.

In this embodiment, the CP and the USF may exchange data through the first communication interface. The first communication interface may include a NETCONF, RESTFUL, or another communication interface, so that the CP and the USF may align, through the first communication interface, content of messages transmitted between the CP and the USF. This improves communication efficiency.

In a specific implementation of the second aspect of the embodiments of this application, the first message includes a first object field, a first operation field, and a first operation attribute field, and the first request message includes a second object field, a second operation field, and a second operation attribute field.

In this embodiment, in a communication interface (for example, the first communication interface) between the USF and the CP, a data model that may be used includes at least three fields, namely, an object field, an operation field, and an operation attribute field. In this case, the first message sent by the CP to the USF and the first message sent by the USF to the CP may each include the at least three fields, so that the CP and the USF may align, based on the at least three fields, content of messages transmitted between the CP and the USF. This improves communication efficiency.

In a specific implementation, the second aspect of the embodiments of this application may be applied to a scenario in which the CP schedules an end user to go online. In this case, in the first message, the first object field includes the user access information and the SLA information, the SLA information includes initial SLA information, and the first operation field includes information whose indication operation type is user online. In the first request message, the second object field includes the user access information, the second operation field includes information whose indication operation type is a first steering request, and the second operation attribute field includes the identifier of the target UP.

In this embodiment, in the communication interface between the USF and the CP, the CP may indicate the to-be-scheduled end user to the USF by using the user access information and the SLA information that are included in the first object field; and indicate, by using the information whose indication operation type is user online included in the first operation field, the USF to schedule the end user to go online. Then, in the communication interface between the USF and the CP, the USF may indicate the currently scheduled end user to the CP by using the user access information in the second object field; indicate, by using the information whose indication operation type is the first steering request included in the second operation field, the CP to perform go-online steering of the end user; and indicate, by using the identifier of the target UP included in the second operation attribute field, the CP to steer the end user to the target UP. This implements scheduling of an online connection of the end user in the BNG.

In a specific implementation, the second aspect of the embodiments of this application may be applied to a scenario in which the CP updates an SLA of an end user. In this case, in the first message, the first object field includes the user access information and the SLA information, the SLA information includes SLA update information, and the first operation field includes information whose indication operation type is user SLA update. In the first request message, the second object field includes the user access information, the second operation field includes information whose indication operation type is a second steering request, and the second operation attribute field includes the identifier of the target UP.

In this embodiment, when the CP updates the SLA of the end user, in the communication interface between the USF and the CP, the CP may indicate the to-be-scheduled end user to the USF by using the user access information and the SLA information that are included in the first object field; and indicate, by using the information whose indication operation type is user SLA update included in the first operation field, the USF to update the SLA of the end user. Then, in the communication interface between the USF and the CP, the USF may indicate the currently scheduled end user to the CP by using the user access information in the second object field; indicate, by using the information whose indication operation type is the second steering request included in the second operation field, the CP to perform steering of the end user based on an updated SLA; and indicate, by using the identifier of the target UP included in the second operation attribute field, the CP to steer the end user to the target UP. This implements scheduling of connection update of the end user in the BNG.

In a specific implementation of the second aspect of the embodiments of this application, the user access information includes a steering function entity SF identity ID, media access control layer MAC information, QinQ information, and an initial user plane entity UP ID.

In this embodiment, different user access information may indicate one or more different end users. The CP may indicate, to the USF by using the SF ID, the QinQ information, the initial UP ID, and the like that are included in the user access information, one or more different end users who need to be scheduled. In this way, the end users who need to be scheduled can be indicated to the USF in a plurality of implementations. This improves implementation flexibility of the solution.

In a specific implementation of the second aspect of the embodiments of this application, the user access information further includes at least one of the following: network segment information, a group UP ID, and an access interface ID.

In this embodiment, the user access information may include the SF ID, the QinQ information, and the initial UP ID. In addition, when the user access information needs to indicate to the USF to schedule a plurality of different end users, the user access information may further include the network segment information, the group UP ID, and the access interface ID, to indicate to the USF to schedule a plurality of different end users corresponding to at least one of the network segment information, the group UP ID, and the access interface ID.

In a specific implementation of the second aspect of the embodiments of this application, the BNG further includes the software-defined network SDN controller, and after the USF receives the first message from the CP, the method further includes: The USF may further determine, based on the first message, an identifier of a target steering function entity SF associated with the end user and a virtual local area network VLAN identifier of the end user. Then, the USF sends a second request message to the SDN controller, where the second request message includes the VLAN identifier, the identifier of the target SF, and the identifier of the target UP.

In this embodiment, the USF may further determine, based on the first message, the identifier of the target SF associated with the end user and the VLAN identifier. Then, the USF may indicate, by using the second request message that includes the VLAN identifier, the identifier of the target SF, and the identifier of the target UP, the SDN controller to schedule, on the target SF, the end user corresponding to the VLAN identifier to the target UP. In a process of scheduling the end user to the target UP, the end user may be scheduled to an SF sub-interface corresponding to the target UP. The SDN controller may control the SF to schedule end users who access different SF sub-interfaces in the SF. Therefore, the USF may schedule the end user to the target UP via the SDN controller by using the second request message. In this way, on a basis that a scheduling policy of the end user is determined in the BNG device via the USF, dynamic scheduling of the end user is also implemented via the USF. This can further reduce processing load of the control plane entity CP, and improve communication performance.

In a specific implementation of the second aspect of the embodiments of this application, the USF and the SDN controller may exchange data through a second communication interface. The USF may send the second request message to the SDN controller through the second communication interface.

In this embodiment, the USF and the SDN controller may exchange data through the second communication interface. The second communication interface may include a NETCONF, RESTFUL, or another communication interface, so that the USF and the SDN controller may align, through the second communication interface, content of messages transmitted between the USF and the SDN controller. This improves communication efficiency.

In a specific implementation of the second aspect of the embodiments of this application, the second request message includes a third object field, a third operation field, and a third operation attribute field.

In this embodiment, in a communication interface (for example, the second communication interface) between the USF and the SDN controller, a data model that may be used includes at least three fields, namely, an object field, an operation field, and an operation attribute field. In this case, the second request message sent by the USF to the SDN controller may include the at least three fields, so that the USF and the SDN controller may align, based on the at least three fields, content of messages transmitted between the USF and the SDN controller. This improves communication efficiency.

In a specific implementation, the second aspect of the embodiments of this application may be applied to a scenario in which the USF schedules an end user to go online. In this case, in the second request message, the third object field includes the VLAN identifier, the third operation field includes information whose indication operation type is a third steering request, and the third operation attribute field includes the identifier of the target SF and the identifier of the target UP.

In this embodiment, when the USF determines, based on the first message, that the end user needs to be scheduled to go online, in the communication interface between the USF and the SDN controller, the USF may indicate the to-be-scheduled end user to the SDN controller by using the VLAN identifier included in the third object field; indicate, by using the information whose indication operation type is the third steering request included in the third operation field, the SDN controller to perform go-online steering of the end user; and indicate, by using the identifier of the target SF and the identifier of the target UP that are included in the third operation attribute field, the SDN controller to schedule, in the target SF, the end user to the target UP. This implements scheduling of an online connection of the end user in the BNG.

In a specific implementation, the second aspect of the embodiments of this application may be applied to a scenario in which the USF updates a connection of an end user. In this case, in the second request message, the third object field includes the VLAN identifier, the third operation field includes information whose indication operation type is a fourth steering request, and the third operation attribute field includes the identifier of the target SF and the identifier of the target UP.

In this embodiment, when the USF determines, based on the first message, that the connection of the end user needs to be updated, in the communication interface between the USF and the SDN controller, the USF may indicate the to-be-scheduled end user to the USF by using the VLAN identifier included in the third object field; indicate, by using the information whose indication operation type is the fourth steering request included in the third operation field, the SDN controller to perform steering of the end user based on an updated SLA; and indicate, by using the identifier of the target SF and the identifier of the target UP that are included in the third operation attribute field, the SDN controller to schedule, in the target SF, the end user to the target UP. This implements scheduling of connection update of the end user in the BNG.

A third aspect of the embodiments of this application provides a communication method, applied to a software-defined network SDN controller. The SDN controller is included in a broadband network gateway BNG, and the BNG further includes a control plane entity CP and a user plane steering function entity USF. In the method, the SDN controller receives a second request message from the USF, where the second request message includes a virtual local area network VLAN identifier, an identifier of a target SF, and an identifier of a target UP. To be specific, the USF indicates, by using the second request message, the SDN controller to schedule, in the target SF, a connection between an end user corresponding to the VLAN identifier and the target UP. Then, the SDN controller processes, in the target SF based on the second request message, the connection between the end user corresponding to the VLAN identifier and the target UP. The SDN controller receives the second request message from the USF, where the second request message includes an identifier of the end user, the identifier of the target UP, and the identifier of the target SF. To be specific, the USF indicates, by using the second request message, the SDN controller to schedule, in the target SF, the connection between the end user corresponding to the VLAN identifier and the target UP. Then, the SDN controller processes, in the target SF based on the second request message, the connection between the end user and the target UP, so that the SDN controller implements dynamic scheduling of the end user in the BNG device based on an indication of the USF. This can reduce processing load of the control plane entity CP, and improve communication performance.

In a specific implementation of the third aspect of the embodiments of this application, the USF and the SDN controller may exchange data through a second communication interface. The USF may send the second request message to the SDN controller through the second communication interface.

In this embodiment, the USF and the SDN controller may exchange data through the second communication interface. The second communication interface may include a NETCONF, RESTFUL, or another communication interface, so that the USF and the SDN controller may align, through the second communication interface, content of messages transmitted between the USF and the SDN controller. This improves communication efficiency.

In a specific implementation of the third aspect of the embodiments of this application, the second request message includes a third object field, a third operation field, and a third operation attribute field.

In this embodiment, in a communication interface between the SDN controller and the USF, a data model that may be used includes at least three fields, namely, an object field, an operation field, and an operation attribute field. In this case, the second request message sent by the USF to the SDN controller may include the at least three fields, so that the USF and the SDN controller may align, based on the at least three fields, content of messages transmitted between the USF and the SDN controller. This improves communication efficiency.

In a specific implementation, the third aspect of the embodiments of this application may be applied to a scenario in which the USF schedules an end user to go online. In this case, in the second request message, the third object field includes the VLAN identifier, the third operation field includes information whose indication operation type is a third steering request, and the third operation attribute field includes the identifier of the target SF and the identifier of the target UP.

In this embodiment, in the communication interface between the USF and the SDN controller, the USF may indicate the to-be-scheduled end user to the SDN controller by using the VLAN identifier included in the third object field; indicate, by using the information whose indication operation type is the third steering request included in the third operation field, the SDN controller to perform go-online steering of the end user; and indicate, by using the identifier of the target SF and the identifier of the target UP that are included in the third operation attribute field, the SDN controller to schedule, in the target SF, the end user to the target UP. This implements scheduling of an online connection of the end user in the BNG.

In a specific implementation, the third aspect of the embodiments of this application may be applied to a scenario in which the USF updates a connection of an end user. In this case, in the second request message, the third object field includes the VLAN identifier, the third operation field includes information whose indication operation type is a fourth steering request, and the third operation attribute field includes the identifier of the target SF and the identifier of the target UP.

In this embodiment, in the communication interface between the USF and the SDN controller, the USF may indicate the to-be-scheduled end user to the USF by using the VLAN identifier included in the third object field; indicate, by using the information whose indication operation type is the fourth steering request included in the third operation field, the SDN controller to perform steering of the end user based on an updated SLA; and indicate, by using the identifier of the target SF and the identifier of the target UP that are included in the third operation attribute field, the SDN controller to schedule, in the target SF, the end user to the target UP. This implements scheduling of connection update of the end user in the BNG.

In a specific implementation of the third aspect of the embodiments of this application, the BNG further includes the target SF. When the second request message includes the information whose indication operation type is the third steering request, that the SDN controller processes, in the target SF based on the second request message, the connection between the end user corresponding to the VLAN identifier and the target UP includes: The SDN controller sends a third request message to the target SF, where the third request message includes the VLAN identifier and the identifier of the target UP.

In this embodiment, in a process of scheduling the end user to the target UP, the end user may be scheduled to an SF sub-interface corresponding to the target UP. The SDN controller may control the SF to schedule end users who access different SF sub-interfaces in the SF. In this case, the SDN controller may specifically steer, in the SF in the BNG, the end user corresponding to the VLAN identifier to the target UP by using the third request message, so that the end user goes online in the BNG device.

In a specific implementation of the third aspect of the embodiments of this application, the SDN controller and the SF may exchange data through a third communication interface. The SDN controller may send the third request message to the target SF through the third communication interface.

In this embodiment, the SDN controller and the SF may exchange data through the third communication interface. The third communication interface may include a NETCONF, RESTFUL, or another communication interface, so that the SDN controller and the SF may align, through the second communication interface, content of messages transmitted between the SDN controller and the SF. This improves communication efficiency.

In a specific implementation of the third aspect of the embodiments of this application, the third request message includes a fourth object field, a fourth operation field, and a fourth operation attribute field.

In this embodiment, in a communication interface between the SDN controller and the SF, a data model that may be used includes at least three fields, namely, an object field, an operation field, and an operation attribute field. In this case, the third request message sent by the SDN controller to the SF may include the at least three fields, so that the SDN controller and the SF may align, based on the at least three fields, content of messages transmitted between the SDN controller and the SF. This improves communication efficiency.

In a specific implementation, the third aspect of the embodiments of this application may be applied to a scenario in which the SDN controller schedules an end user to go online. To be specific, the second request message carries the information whose indication operation type is the third steering request. In this case, in the third request message, the fourth object field includes the VLAN identifier, the fourth operation field includes information whose indication operation type is a fifth steering request, and the fourth operation attribute field includes the identifier of the target UP.

In this embodiment, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform go-online steering of the end user; and indicate, by using the identifier of the target UP included in the third operation attribute field, the SF to schedule the end user to the target UP. This implements scheduling of an online connection of the end user in the BNG.

In a specific implementation, the third aspect of the embodiments of this application may be applied to a scenario in which the SDN controller updates a connection of an end user. To be specific, the second request message carries the information whose indication operation type is the fourth steering request. In this case, in the third request message, the fourth object field includes the VLAN identifier, the fourth operation field includes information whose indication operation type is a sixth steering request, and the fourth operation attribute field includes the identifier of the target UP.

In this embodiment, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform steering of the end user based on an updated SLA; and indicate, by using the identifier of the target UP included in the third operation attribute field, the SF to schedule the end user to the target UP. This implements scheduling of connection update of the end user in the BNG.

A fourth aspect of the embodiments of this application provides a communication method, applied to a steering function entity SF. In the method, the SF receives a third request message from an SDN controller, where the third request message includes an identifier of an end user and an identifier of a target UP. Then, the SF processes the connection between the end user and the target UP based on the third request message. The SF may determine the identifier of the end user and the identifier of the target UP based on the third request message sent by the SDN controller, and further process the connection between the end user and the target UP based on the third request message. This implements dynamic scheduling of a connection manner between the end user and the SF in the BNG.

In a specific implementation of the fourth aspect of the embodiments of this application, the SDN controller and the SF may exchange data through a third communication interface. The SDN controller may send the third request message to the target SF through the third communication interface.

In this embodiment, the SDN controller and the SF may exchange data through the third communication interface. The third communication interface may include a NET-CONF, RESTFUL, or another communication interface, so that the SDN controller and the SF may align, through the second communication interface, content of messages transmitted between the SDN controller and the SF. This improves communication efficiency.

In a specific implementation of the fourth aspect of the embodiments of this application, the third request message includes a fourth object field, a fourth operation field, and a fourth operation attribute field.

In this embodiment, in a communication interface between the SF and the SDN controller, a data model that may be used includes at least three fields, namely, an object field, an operation field, and an operation attribute field. In this case, the third request message sent by the SDN controller to the SF may include the at least three fields, so that the SF and the SDN controller may align, based on the at least three fields, content of messages transmitted between the SF and the SDN controller. This improves communication efficiency.

In a specific implementation, the fourth aspect of the embodiments of this application may be applied to a scenario in which the SDN controller schedules an end user to go online. In this case, in the third request message, the fourth object field includes a VLAN identifier, the fourth operation field includes information whose indication operation type is a fifth steering request, and the fourth operation attribute field includes the identifier of the target UP.

In this embodiment, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform go-online steering of the end user; and indicate, by using the identifier of the target UP included in the third operation attribute field, the SF to schedule the end user to the target UP. This implements scheduling of an online connection of the end user in the BNG.

In a specific implementation, the fourth aspect of the embodiments of this application may be applied to a scenario in which the SDN controller updates a connection of an end user. In this case, in the third request message, the fourth object field includes the VLAN identifier, the fourth operation field includes information whose indication operation type is a sixth steering request, and the fourth operation attribute field includes the identifier of the target UP.

In this embodiment, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform steering of the end user based on an updated SLA; and indicate, by using the identifier of the target UP included in the third operation attribute field, the SF to schedule the end user to the target UP. This implements scheduling of connection update of the end user in the BNG.

A fifth aspect of the embodiments of this application provides a communication method, applied to a control plane entity CP. The CP is included in a broadband network gateway BNG, and the BNG further includes a user plane steering function entity USF. In the method, the CP obtains a go-offline request message, where the go-offline request message includes end user information, and the end user information includes user access information. Then, the CP sends a first message to the USF, where the first message includes information whose first indication operation type is user offline and the user access information. The CP sends the first message to the USF. The first message includes the information whose first indication operation type is user offline and the user access information, and indicates the USF to schedule, based on the end user information, the end user to go offline. Then, the USF deletes connection information corresponding to the end user. In this way, the connection information corresponding to the end user is stored via the USF. This can reduce storage load of the control plane entity CP, and improve communication performance.

In a specific implementation of the fifth aspect of the embodiments of this application, the first message may include a first object field, a first operation field, and a first operation attribute field, and the first request message includes a second object field, a second operation field, and a second operation attribute field.

In this embodiment, the CP and the USF may communicate with each other through a NETCONF, RESTFUL, or another interface. In a communication interface between the CP and the USF, a data model that may be used includes at least three fields, namely, an object field, an operation field, and an operation attribute field. In this case, the first message sent by the CP to the USF and the first message sent by the USF to the CP may each include the at least three fields, so that the CP and the USF may align, based on the at least three fields, content of messages transmitted between the CP and the USF. This improves communication efficiency.

In a specific implementation, the fifth aspect of the embodiments of this application may be applied to a scenario in which the CP schedules an end user to go offline. In this case, in the first message, the first object field includes the user access information, and the first operation field includes the information whose first indication operation type is user offline.

In this embodiment, in the communication interface between the CP and the USF, the CP may indicate the to-be-scheduled end user to the USF by using the user access information included in the first object field; and indicate, by using the information whose first indication operation type is user offline included in the first operation field, the USF to schedule the end user to go offline. Then, the USF may schedule, based on the first message, the end user to go offline. This implements scheduling of disconnection of the end user in the BNG.

In a specific implementation of the fifth aspect of the embodiments of this application, the user access information includes a steering function entity SF identity ID, media access control layer MAC information, QinQ information, and an initial user plane entity UP ID; the user access information includes network segment information; the user access information includes a group UP ID; or the user access information includes an access interface ID.

In this embodiment, different user access information may indicate one or more different end users. The CP may indicate, to the USF by using information such as the SF ID, the QinQ information, and the initial UP ID that are included in the user access information, one or more different end users who need to be scheduled. In this way, the end users who need to be scheduled can be indicated to the USF in a plurality of implementations. This improves implementation flexibility of the solution.

In a specific implementation of the fifth aspect of the embodiments of this application, the user access information further includes at least one of the following: the network segment information, the group UP ID, and the access interface ID.

In this embodiment, the user access information may include the SF ID, the QinQ information, and the initial UP ID. In addition, when the user access information needs to indicate to the USF to schedule a plurality of different end users, the user access information may further include the network segment information, the group UP ID, and the access interface ID, to indicate to the USF to schedule a plurality of different end users corresponding to at least one of the network segment information, the group UP ID, and the access interface ID.

A sixth aspect of the embodiments of this application provides a communication method, applied to a user plane steering function entity USF. The USF is included in a broadband network gateway BNG, and the BNG further includes a control plane entity CP and a software-defined network SDN controller. In the method, when the CP schedules an end user, the USF receives a first message from the CP, where the first message includes information whose first indication operation type is user offline and user access information. Then, the USF deletes, based on the first message, connection information corresponding to the end user. In this way, the connection information corresponding to the end user is stored via the USF. This can reduce storage load of the control plane entity CP, and improve communication performance.

In a specific implementation of the sixth aspect of the embodiments of this application, the first message includes a first object field, a first operation field, and a first operation attribute field, and a first request message includes a second object field, a second operation field, and a second operation attribute field.

In this embodiment, the USF and the CP may communicate with each other through a NETCONF, RESTFUL, or another interface. In a communication interface between the USF and the CP, a data model that may be used includes at least three fields, namely, an object field, an operation field, and an operation attribute field. In this case, the first message sent by the CP to the USF and the first message sent by the USF to the CP may each include the at least three fields, so that the CP and the USF may align, based on the at least three fields, content of messages transmitted between the CP and the USF. This improves communication efficiency.

In a specific implementation, the sixth aspect of the embodiments of this application may be applied to a scenario in which the CP schedules an end user to go offline. In this case, in the first message, the first object field includes the user access information, and the first operation field includes the information whose first indication operation type is user offline.

In this embodiment, in the communication interface between the CP and the USF, the CP may indicate the to-be-scheduled end user to the USF by using the user access information included in the first object field; and indicate, by using the information whose first indication operation type is user offline included in the first operation field, the USF to schedule the end user to go offline. Then, the USF may schedule, based on the first message, the end user to go offline, to be specific, the USF deletes the connection information corresponding to the end user. This implements scheduling of disconnection of the end user in the BNG.

A seventh aspect of the embodiments of this application provides a control plane entity CP. The CP has a function of implementing the method in any one of the first aspect or the specific implementations of the first aspect, or the CP has a function of implementing the method in any one of the fifth aspect or the specific implementations of the fifth aspect. The function may be implemented by hardware, or may be implemented by hardware executing corresponding software. The hardware or software includes one or more modules corresponding to the foregoing functions, for example, a receiving unit, a sending unit, and a processing unit.

An eighth aspect of the embodiments of this application provides a user plane steering function entity USF. The USF has a function of implementing the method in any one of the second aspect or the specific implementations of the second aspect, or the CP has a function of implementing the method in any one of the sixth aspect or the specific implementations of the sixth aspect. The function may be implemented by hardware, or may be implemented by hardware executing corresponding software. The hardware or software includes one or more modules corresponding to the foregoing functions, for example, a receiving unit, a sending unit, and a processing unit.

A ninth aspect of the embodiments of this application provides a software-defined network SDN controller. The SDN controller has a function of implementing the method in any one of the third aspect or the specific implementations of the third aspect. The function may be implemented by hardware, or may be implemented by hardware executing corresponding software.

The hardware or software includes one or more modules corresponding to the foregoing functions, for example, a receiving unit, a sending unit, and a processing unit.

A tenth aspect of the embodiments of this application provides a steering function entity SF. The SF has a function of implementing the method in any one of the fourth aspect or the specific implementations of the fourth aspect. The function may be implemented by hardware, or may be implemented by hardware executing corresponding software. The hardware or software includes one or more modules corresponding to the foregoing functions, for example, a receiving unit, a sending unit, and a processing unit.

An eleventh aspect of the embodiments of this application provides a control plane entity CP. The CP includes at least one processor, a memory, and computer-executable instructions that are stored in the memory and that can run on the processor. When the computer-executable instructions are executed by the processor, the processor performs the method according to any one of the first aspect or the specific implementations of the first aspect, or the processor performs the method according to any one of the fifth aspect or the specific implementations of the fifth aspect.

A twelfth aspect of the embodiments of this application provides a user plane steering function entity USF. The USF includes at least one processor, a memory, and computer-executable instructions that are stored in the memory and that can run on the processor. When the computer-executable instructions are executed by the processor, the processor performs the method according to any one of the second aspect or the specific implementations of the second aspect, or the processor performs the method according to any one of the sixth aspect or the specific implementations of the sixth aspect.

A thirteenth aspect of the embodiments of this application provides a software-defined network SDN controller. The SDN controller includes at least one processor, a memory, and computer-executable instructions that are stored in the memory and that can run on the processor. When the computer-executable instructions are executed by the processor, the processor performs the method according to any one of the third aspect or the specific implementations of the third aspect.

A fourteenth aspect of the embodiments of this application provides a steering function entity SF. The SF includes at least one processor, a memory, and computer-executable instructions that are stored in the memory and that can run on the processor. When the computer-executable instructions are executed by the processor, the processor performs the method according to any one of the fourth aspect or the specific implementations of the fourth aspect.

A fifteenth aspect of the embodiments of this application provides a broadband network gateway BNG, where the BNG includes the control plane entity CP in the seventh aspect and the user plane steering function entity USF in the eighth aspect.

In a specific implementation of the fifteenth aspect of the embodiments of this application, the BNG further includes the software-defined network SDN controller in the ninth aspect.

In a specific implementation of the fifteenth aspect of the embodiments of this application, the BNG further includes the steering function entity SF in the tenth aspect.

A sixteenth aspect of the embodiments of this application provides a computer-readable storage medium storing one or more computer-executable instructions. When the computer-executable instructions are executed by a processor, the processor performs the method according to any one of the first aspect to the sixth aspect or the specific implementations of the first aspect to the sixth aspect.

A seventeenth aspect of the embodiments of this application provides a computer program product storing one or more computer-executable instructions. When the computer-executable instructions are executed by a processor, the processor performs the method according to any one of the first aspect to the sixth aspect or the specific implementations of the first aspect to the sixth aspect.

An eighteenth aspect of the embodiments of this application provides a chip system. The chip system includes a processor, and the processor may include a baseband processor (BP). For example, the processor may further include an application processor (AP), and is configured to support the communication apparatus to implement the method according to any one of the first aspect to the sixth aspect or the specific implementations of the first aspect to the sixth aspect. In a specific design, the chip system may further include a memory. The memory is configured to store necessary program instructions and data. The chip system may include a chip, or may include a chip and another discrete component.

For technical effects brought by any one of the seventh aspect, the eleventh aspect, the fifteenth aspect to the eighteenth aspect, or specific implementations thereof, refer to technical effects brought by the first aspect or the different specific implementations of the first aspect, and details are not described herein again; or refer to technical effects brought by the fifth aspect or the different specific implementations of the fifth aspect, and details are not described herein again.

For technical effects brought by any one of the eighth aspect, the twelfth aspect, the fifteenth aspect to the eighteenth aspect, or specific implementations thereof, refer to technical effects brought by the second aspect or the different specific implementations of the second aspect, and details are not described herein again; or refer to technical effects brought by the sixth aspect or the different specific implementations of the sixth aspect, and details are not described herein again.

For technical effects brought by any one of the ninth aspect, the thirteenth aspect, the fifteenth aspect to the eighteenth aspect, or specific implementations thereof, refer to technical effects brought by the third aspect or the different specific implementations of the third aspect, and details are not described herein again.

For technical effects brought by any one of the tenth aspect, the fourteenth aspect, the fifteenth aspect to the eighteenth aspect, or specific implementations thereof, refer to technical effects brought by the fourth aspect or the different specific implementations of the fourth aspect, and details are not described herein again.

It can be learned from the foregoing technical solutions that the embodiments of this application have the following advantages: A CP sends a first message to a USF, where the first message includes end user information, and the end user information includes user access information and service level agreement SLA information. Then, the CP receives a first request message from the USF, where the first request message includes an identifier of a target UP, and the target UP is associated with an end user, that is, the first request message indicates to schedule the end user based on the target UP. Then, the CP processes a connection between the end user and the target UP based on the identifier of the target UP. The CP sends the first message to the USF. The first message includes the end user information, and indicates the USF to schedule the end user based on the end user information. Then, the CP determines, based on the identifier of the target UP carried in the first request message sent by the USF, to schedule the end user to the target UP. In other words, a scheduling policy of the end user is determined via the USF. Then, the CP further processes the connection between the end user and the target UP based on the identifier of the target UP, so that the scheduling policy of the end user is determined in the BNG device via the USF. This reduces processing load of the control plane entity CP, and improves communication performance.

DESCRIPTION OF EMBODIMENTS

Embodiments of this application provide a communication method and a related device, to determine a scheduling policy of an end user in a BNG device via a USF, reduce processing load of a control plane entity CP, and improve communication performance.

With the development of a software-defined network (SDN) technology and a network functions virtualization (NFV) technology, a metropolitan area network evolves from a conventional network-centric architecture to a data center-centric network architecture. A conventional network element device also evolves from professional to universal. The evolution of the conventional network element device from professional to universal mainly resolves two decouplings: decoupling of control and forwarding, and decoupling of software and hardware. As a conventional broadband access gateway device, the BNG is very important in a user broadband access service and scenario. Generally, in the BNG device, the CP performs user authentication, access control, user scheduling, and the like on an end user who accesses the BNG device.

Figure 1:
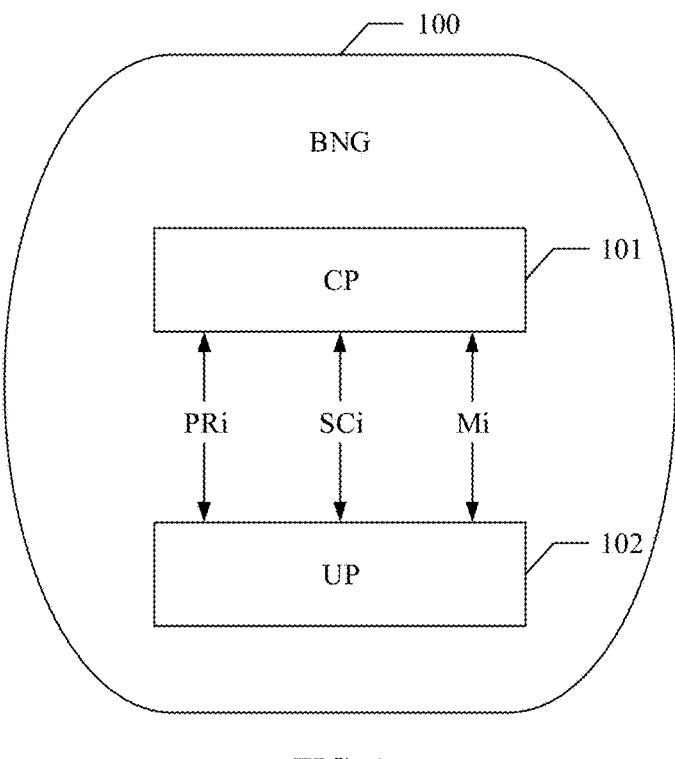
FIG. 1 is a schematic diagram of a network architecture according to an embodiment of this application.

FIG. 1 is a schematic diagram of a network architecture according to an embodiment of this application when dynamic scheduling of a connection of an end user is implemented in a broadband network gateway BNG. The broadband network gateway BNG 100 may include a control plane entity CP 101 and a user plane entity 102. Generally, there may be a plurality of interface implementations between the UP 102 and the CP 101. For example, there are the following three interfaces:

PRi: a service interface using a virtual extensible local area network generic protocol extension (virtual extensible local area network generic protocol extension, VXLAN GPE) interface. A UP receives a user access protocol packet, encapsulates the user access protocol packet through the interface and sends the packet to a CP for processing.

Mi: a management interface using a NETCONF interface. A CP uses the interface to deliver a configuration to a UP, and the UP uses the interface to report some running status.

SCi: a control interface using a control plane and user plane separated protocol (CUSP) interface. A CP processes a user access packet and completes protocol interaction of a user. After the user goes online, the CP delivers a user entry to a corresponding UP through the interface.

A BNG virtualized by using SDN and NFV technologies may be used as a virtual broadband network gateway (vBNG) whose structure is similar to that in FIG. 1. The vBNG includes a virtual broadband network gateway control plane vBNG-CP and a vBNG-UP. Specifically, the vBNG-CP may be used as a virtualized network function (VNF) and run on an x86 server to implement virtualization. The vBNG-UP has two forms: one is a virtual UP (vUP) in a VNF (an x86 server virtualization network element), and the other is a physical forwarding processing unit physical user plane (pUP) in a physical network function (PNF) (a conventional hardware network device). One vBNG-CP may manage a plurality of pUPs and vUPs. The current BNG device implements the foregoing two decouplings based on an SDN/NFV architecture. After forwarding and controlling of the BNG are decoupled, a control plane may manage a plurality of forwarding planes, and schedule users, traffic, and resources between the plurality of forwarding planes. This can greatly improve utilization and reliability of the device. Correspondingly, with development of various internet services, a requirement on a quantity of user sessions supported by the BNG device and a user access bandwidth continuously increase. A requirement on processing performance of a CP in the current BNG device also continuously increases. Consequently, processing load of the CP is excessively heavy, and communication performance is affected.

Figure 2:
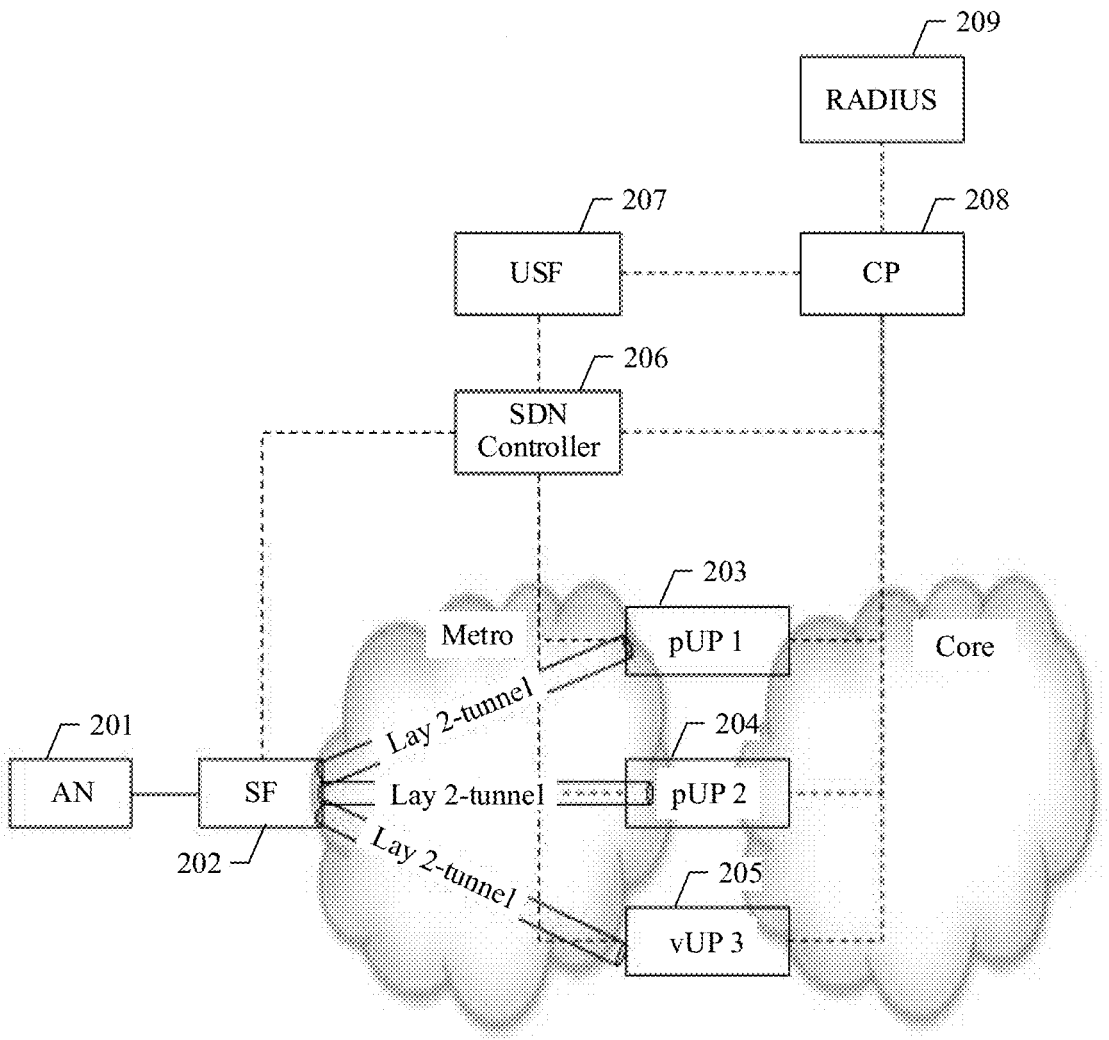
FIG. 2 is another schematic diagram of a network architecture according to an embodiment of this application.

FIG. 2 is another schematic diagram of a network architecture when dynamic scheduling of a connection of an end user is implemented in a broadband network gateway BNG according to an embodiment of this application. A vBNG-UP includes a plurality of pUPs and vUPs. In FIG. 2, an example in which the vBNG-UP includes a pUP 1 (203), a pUP 2 (204), and a vUP 3 (205) is used for description. The pUP 1 (203), the pUP 2 (204), the vUP 3 (205), or a plurality of other UPs may be distributed at a network edge, or may be distributed at a high position in the network. To implement dynamic selection of an UP gateway for a user to access, the vBNG-CP needs to work with a software-defined network (SDN) controller to implement dynamic steering of the user. The following describes network elements involved in FIG. 2.

CP 208: a vBNG service control plane, configured to: process a user dialup protocol, and interact with an authentication, authorization, and accounting (AAA) server to perform user authentication, accounting, and authorization; identify, based on a user account, a service level agreement (SLA) subscribed by a user; and notify, by using access line information carried in the user dialup protocol, a UP steering function (USF) 207 that the user goes online and waits for the USF to guide user steering, and notify the USF to map the user to a port accessed by a corresponding UP. In addition, the CP 208 delivers user entry information to the corresponding UP, and the corresponding UP generates a forwarding entry of the user and advertises a route.

USF 207: a policy control component for UP steering. The USF 207 generates a steering policy based on a status of the user such as the SLA and load, and notifies the CP 208 and an SF 202 to steer the user, to implement network load balancing and an SLA requirement.

pUP 1 (203), pUP 2 (204), and vUP 3 (205) included in the vBNG-UP: vBNG service forwarding planes. After the user goes online, the CP delivers a user entry. The UP receives the user entry delivered by the CP 208, generates the forwarding entry for the user locally, executes a corresponding service policy, forwards traffic, and advertises the route.

Steering function (SF) entity 202: The SF 202 is used as a user access gateway. When the user goes online, the SF 202 may send a dialup protocol packet of the user to the CP through a service channel for processing, and aggregate home terminals, to aggregate users to the UP. The SF 202 forwards a layer 2 packet and isolates the users by a virtual local area network (VLAN)/double VLAN (802.1Q in 802.1Q, QinQ). Each user has an exclusive VLAN/QinQ. In the network architecture, one or more SFs 202 may exist, to support a scenario of access of different quantities of ANs 201.

Access node (AN) 201: A Residential gateway (RGW) may access the BNG device via the AN, where the RGW may be a PC, a mobile phone, a tablet computer, or another terminal. The AN usually performs network address translation (network address translation, NAT) processing on the RGW, allocates a private IP address to the RGW, to perform point-to-point protocol over Ethernet (PPPoE) dialup and internet protocol over Ethernet (IPoE) dialup, and obtains an IP address from the vBNG for network access.

SDN controller 206: The SDN controller 206 receives, via the USF 207, access line information that is of the corresponding user and that is sent by the CP 208, where the access line information includes an identity (ID) document, of an accessed switch (switch, SW)/optical line termination (optical line termination, OLT), access port information, VLAN information, and the like. The SDN controller 206 delivers a steering policy to the corresponding SW/OLT and maps a port and a VLAN/QinQ of the user to a layer 2 tunnel connected to the corresponding UP, for example, the layer 2 tunnel may be a generic protocol extension for virtual extensible local area network (VXLAN), a virtual leased line (VLL), or an Ethernet virtual private network (EVPN).

In the network architecture shown in FIG. 2 compared with the network architecture shown in FIG. 1, specifically, the SF 202 device is added behind an access node (AN) 201 access network when dynamic scheduling of the connection of the end user is implemented in the broadband network gateway BNG. The layer 2 tunnel is established between the device and the vBNG-UP. A physical interface accessed by the SF 202 and the AN 201 is divided into different sub-interfaces. The different sub-interfaces match different virtual local area network (VLAN)/double VLAN (QinQ, 802.1Q in 802.1Q) ranges, and the different sub-interfaces are corresponding to different layer 2 tunnels. Specifically, the AN 201 may go online from the pUP 1 (203) by default, and a control packet is sent to the CP 208. The CP 208 exchanges a user steering policy with the USF 207. The USF 207 determines, based on a service level agreement (SLA) of the AN 201, that access should be from the pUP 2 (204), and notifies the CP 208 to deliver the user entry to the pUP 2 (204). In addition, the USF 207 notifies the SDN controller 206 to configure the SF 202, and bind the VLAN/QinQ corresponding to the user to an interface corresponding to the pUP 2 (204). A subsequent forwarding packet of the AN 201 is directly forwarded to the pUP 2 (204). The USF 207 is a policy point for dynamic steering. The CP 208 asks the USF 207 whether to perform steering, and the USF 207 notifies the CP 208 and the SDN controller 206 to perform steering. The policy point may be built in the CP 208 or the SDN controller 206, or may be an independent network element.

The foregoing describes the network architecture and some implementation processes implemented in the embodiments of this application. The following describes the communication method provided in the embodiments of this application with reference to a specific implementation process.

Figure 3:
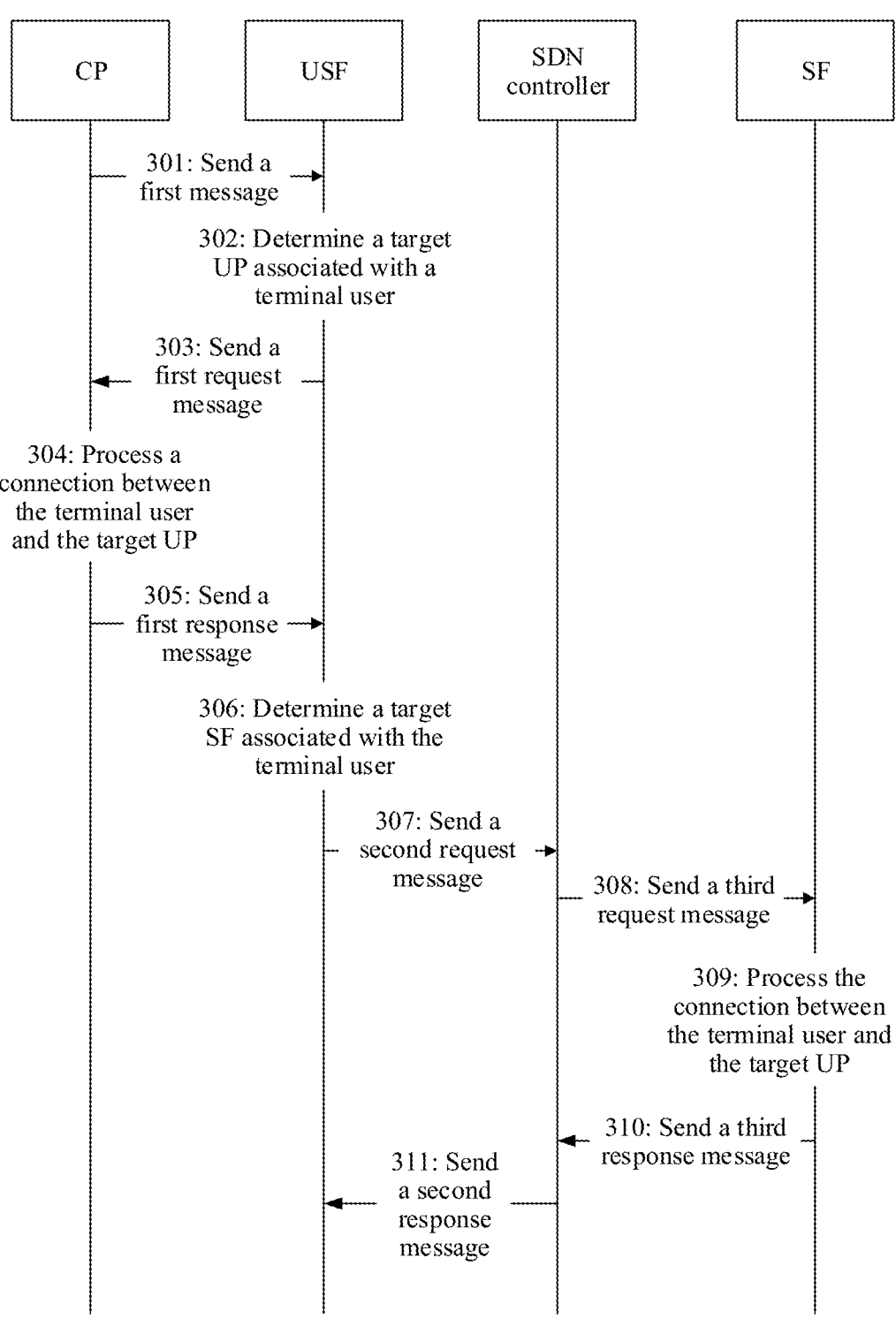
FIG. 3 is a schematic diagram of an embodiment of a communication method according to an embodiment of this application.

Refer to FIG. 3. An embodiment of a communication method in the embodiments of this application includes the following steps.

301: A CP sends a first message to a USF.

In this embodiment, the CP sends the first message to the USF. Correspondingly, the USF obtains the first message in step 301, where the first message includes end user information, and is used to indicate the USF to schedule a corresponding end user based on the end user information, and the end user information includes user access information. Optionally, the end user information may further include service level agreement SLA information.

In a specific implementation, the CP is included in a broadband network gateway BNG, and the BNG further includes the USF. As shown in the network architecture shown in FIG. 2, in a specific implementation, the BNG may further include a UP, an SF, and the like.

In a specific implementation, the CP and the USF may exchange data through the first communication interface. The first communication interface may include a NETCONF, RESTFUL, or another communication interface, so that the CP and the USF may align, through the first communication interface, content of messages transmitted between the CP and the USF. This improves communication efficiency.

In a specific implementation, the first message may include a first object field, a first operation field, and a first operation attribute field. Specifically, the CP and the USF may communicate with each other through a NETCONF, RESTFUL, or another interface. In a communication interface between the CP and the USF, a data model that may be used includes at least three fields, namely, an object field, an operation field, and an operation attribute field. The object field is used to indicate an identifier of an end user of an operation corresponding to a transmitted message, the operation field is used to indicate an operation type of the operation corresponding to the transmitted message, and the operation attribute field is used to indicate an operation port of the operation corresponding to the transmitted message. In this case, the first message sent by the CP to the USF may include the at least three fields, so that the CP and the USF may align, based on the at least three fields, content of messages transmitted between the CP and the USF. This improves communication efficiency. In this embodiment and subsequent embodiments, an example in which a message sent by the CP to the USF includes the first object field, the first operation field, and the first operation attribute field, and a message sent by the USF to the CP includes a second object field, a second operation field, and a second operation attribute field is used for description.

It should be noted that, specifically, "align" means that when different communication devices exchange a message through a wired or wireless interface, the two communication devices have consistent understandings of a carrier frequency for receiving and sending the exchanged message, determining of a type of the exchanged message, meanings of field information carried in the exchanged message, or other configurations of the exchanged message. Specifically, the CP and the USF may have consistent understandings of the meanings of the field information carried in the "at least three fields" based on the "at least three fields" carried in the message transmitted through the interface between the CP and the USF.

Figure 4:
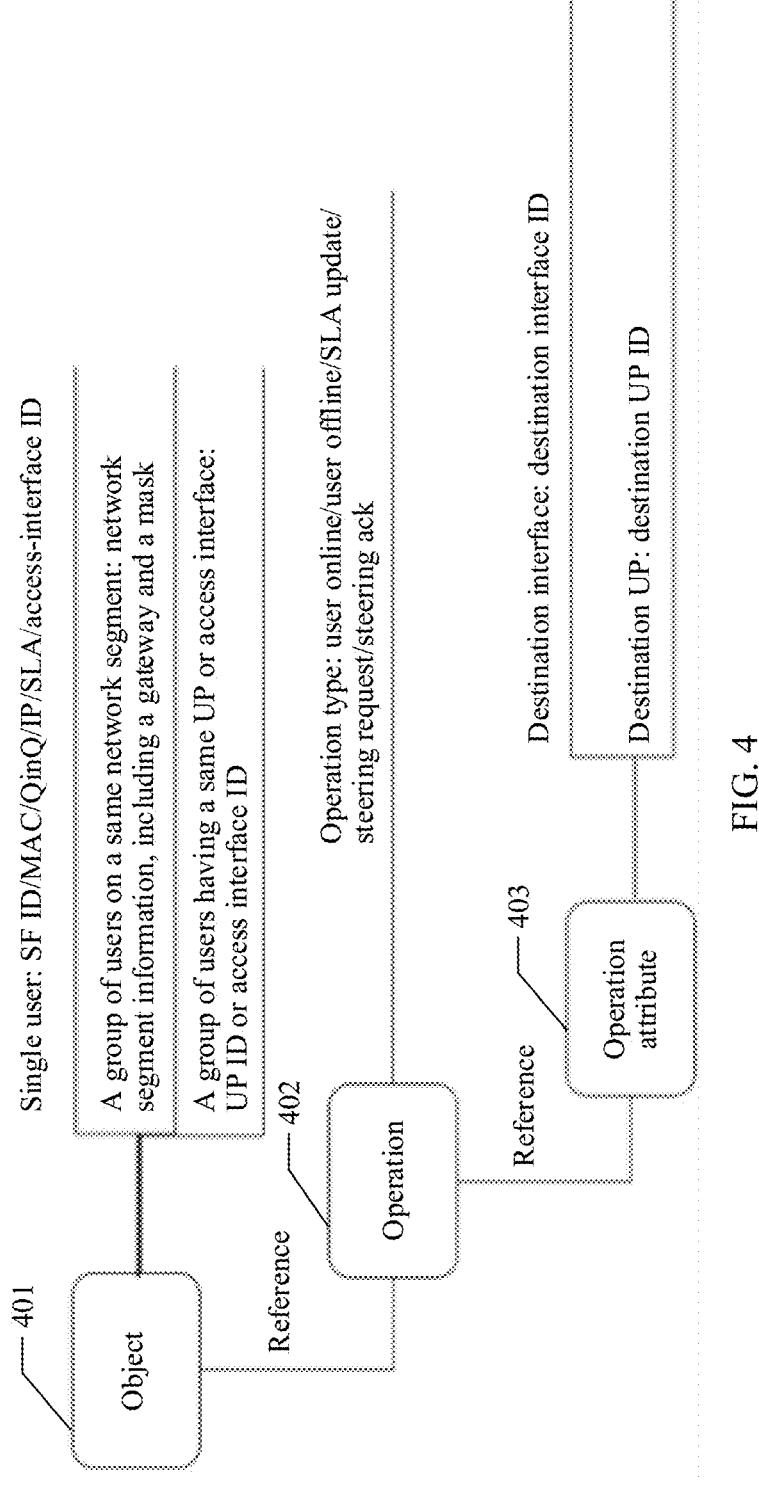
FIG. 4 is another schematic diagram of an embodiment of a communication method according to an embodiment of this application.

For example, a data model used by the communication interface between the CP and the USF may be shown in FIG. 4. In the at least three fields of the data model of the interface between the CP and the USF, an object 401, an operation 402, and an operation attribute 403 are used as examples for description. It is clear that the at least three fields may alternatively be represented by other names. For example, the object field, the operation field, and the operation attribute field may be represented by a terminal, an implementation, and an implementation attribute; the object field, the operation field, and the operation attribute field may be represented by an A field, a B field, and a C field; or the object field, the operation field, and the operation attribute field may be represented in another manner. This is not limited herein.

Specifically, in the first message transmitted in step 301, the object 401 (namely, the object field) may carry the user access information, and the user access information includes a steering function entity SF identity ID, QinQ information, and an initial user plane entity UP ID. Optionally, the user access information may further include media access control layer MAC information. The user access information further includes at least one of the following: network segment information, a group UP ID, and an access interface ID (for example, a single user indicated by the object 401: SF ID/MAC/QinQ/IP/SLA/access-interface ID).

Further, the user access information may include the SF ID, the QinQ information, and the initial UP ID. In addition, when the user access information needs to indicate to the USF to schedule a plurality of different end users, the user access information may further include the network segment information, the group UP ID, and the access interface ID, to indicate to the USF to schedule a plurality of different end users corresponding to at least one of the network segment information, the group UP ID, and the access interface ID. For example, the user access information includes the network segment information (a group of users on a same network segment, including a gateway and a mask); and/or the user access information includes the group UP ID (a group of users having a same UP); and/or the user access information includes the access interface ID (a group of users having a same access interface). Because different user access information may indicate one or more different end users, by using different user access information, the USF may schedule one or more different end users by using different user access information. In this way, the end users scheduled by the USF based on the end user information can be indicated in a plurality of implementations. This improves implementation flexibility of the solution.

The following describes how different operation fields identified by the operation 402 are applied to different scenarios.

1. In a scenario in which an end user goes online, in the first message, the first object field includes the user access information and the SLA information, and the SLA information includes initial SLA information. Specifically, when the CP determines that the end user goes online, in the communication interface between the CP and the USF, the CP may indicate the to-be-scheduled end user to the USF by using the user access information and the SLA information that are included in the first object field, and indicate, by using information whose indication operation type is user online (user online) included in the first operation field, the USF to schedule the end user to go online.

2. In a scenario of scheduling connection update of the end user, in the first message, the first object field includes the user access information and the SLA information, and the SLA information includes SLA update information. Specifically, when the CP determines to update an SLA of the end user, in the communication interface between the CP and the USF, the CP may indicate the to-be-scheduled end user to the USF by using the user access information and the SLA information that are included in the first object field, and indicate, by using information whose indication operation type is user SLA update (SLA update) included in the first operation field, the USF to update the SLA of the end user.

3. In a scenario of scheduling the end user to go offline, in the first message, the first object field includes the user access information, and the first operation field includes information whose first indication operation type is user offline (user offline). Specifically, in the communication interface between the CP and the USF, the CP may indicate the to-be-scheduled end user to the USF by using the user access information included in the first object field, and indicate, by using the information whose first indication operation type is user offline included in the first operation field, the USF to schedule the end user to go offline.

In addition, before the CP sends the first message to the USF in step 301, the CP may further determine, in a plurality of manners, that step 301 needs to be performed. In other words, step 301 has a triggering process. For example, the triggering process may be: The CP receives a message from a remote access dial-in user server (RADIUS) (for example, an AAA server), in other words, the CP receives the message from the RADIUS 209 in the network architecture shown in FIG. 2, to trigger step 301. The triggering process may alternatively be: The CP receives a request message from the end user, in other words, the CP receives the request message sent by the end user via the AN 201 in the network architecture shown in FIG. 2, to trigger step 301. The CP may further implement the triggering process in another manner, which is not limited herein.

302: The USF determines a target UP associated with the end user.

In this embodiment, the USF obtains the end user information according to step 301, and the first message indicates the USF to schedule the end user based on to the end user information. The USF further determines, based on the end user information, the target UP associated with the end user.

The USF is a policy control component for UP steering. Specifically, the USF may generate a steering policy based on a status of the end user such as an SLA and load, and notify the CP and the SF to steer the user, to implement load balancing of the network and perform scheduling corresponding to an SLA requirement. For example, the USF may manage a plurality of vBNG-UPs, including the pUP 1 (203), the pUP 2 (204), and the vUP 3 (205) in FIG. 2. The USF may pre-allocate corresponding SLA information to different vBNG-UPs one by one, in other words, establish mapping relationships between identifiers of the plurality of vBNG-UPs and a plurality of SLAs.

It is learned from step 301 that, in the first message sent by the CP to the USF, different operation fields identified by the operation 402 may be corresponding to different scenarios. Correspondingly, the USF may determine, in a plurality of manners based on specific content of the first message sent by the CP, the target UP associated with the end user. Details are described below.

1. In a scenario of scheduling an end user to go online, in the communication interface between the CP and the USF, the CP may indicate the to-be-scheduled end user to the USF by using the user access information and the SLA information that are included in the first object field, and indicate, by using the information whose indication operation type is user online included in the first operation field, the USF to schedule the end user to go online. In this case, the USF determines, based on the mapping relationships between the identifiers of the plurality of vBNG-UPs and the plurality of SLAs, that a UP corresponding to the initial SLA information is the target UP.

2. In a scenario of updating the SLA of the end user, in the communication interface between the CP and the USF, the CP may indicate the to-be-scheduled end user to the USF by using the user access information and the SLA information that are included in the first object field, and indicate, by using the information whose indication operation type is user SLA update included in the first operation field, the USF to update the SLA of the end user. In this case, the USF determines, based on the mapping relationships between the identifiers of the plurality of vBNG-UPs and the plurality of SLAs, that a UP corresponding to the SLA update information is the target UP.

3. In a scenario of scheduling the end user to go offline, in the communication interface between the CP and the USF, the CP may indicate the to-be-scheduled end user to the USF by using the user access information included in the first object field, and indicate, by using the information whose first indication operation type is user offline included in the first operation field, the USF to schedule the end user to go offline. In this case, the USF determines, as the target UP, a UP on which the end user who needs to be scheduled to go offline and who is corresponding to the user access information is currently located. Then, after the USF determines the target UP associated with the end user in step 302, the USF deletes connection information corresponding to the end user. Specifically, the connection information corresponding to the end user may be the user access information and/or the SLA information that are associated with the end user and that are stored in the USF. In this way, the connection information corresponding to the end user is stored via the USF. This can reduce storage load of the control plane entity CP, and improve communication performance.

In addition, different user access information may indicate one or more different end users. For a plurality of implementations of specific user access information, refer to the descriptions of step 301. Details are not described herein again. In step 302, the USF may determine, based on the different user access information, respective target UP IDs corresponding to the one or more different end users.

303: The USF sends a first request message to the CP.

In this embodiment, after obtaining an identifier of the target UP in step 302, the USF may send the first request message to the CP, where the first request message includes the identifier of the target UP, and is used to indicate the CP to process a connection between the end user and the target UP.

In the network architecture shown in FIG. 2, the SF 202 device is added behind the AN 201 access network, and a layer 2 tunnel is established between the device and a UP. A physical interface accessed by the SF 202 and the AN 201 is divided into different sub-interfaces. The different sub-interfaces match different VLAN/QinQ ranges. In other words, the different sub-interfaces are corresponding to different layer 2 UP tunnels, and the end user accesses different UPs via different SFs. Therefore, in an implementation process of step 303, the identifier of the target UP is used to identify the UP. During specific implementation, the identifier of the target UP may be an identifier of the target UP itself, or may be an identifier of an SF sub-interface corresponding to the target UP. This is not limited herein.

It is learned from step 301 that, in the first message sent by the CP to the USF, different operation fields identified by the operation 402 may be corresponding to different scenarios.

Correspondingly, the USF may also send the first request message to the CP by using different operation fields, to identify different corresponding scenarios. Details are described below.

1. In a scenario of scheduling an end user to go online, in the first request message, the second object field includes the user access information, the second operation field includes information whose indication operation type is a first steering request (steering request), and the second operation attribute field includes the identifier of the target UP. Specifically, when scheduling the end user to go online, in the communication interface between the USF and the CP, the CP may indicate the to-be-scheduled end user to the USF by using the user access information and the SLA information that are included in the first object field; and indicate, by using the information whose indication operation type is user online included in the first operation field, the USF to schedule the end user to go online. Then, in the communication interface between the USF and the CP, that is, in the first request message sent in step 303, the USF may indicate the currently scheduled end user to the CP by using the user access information in the second object field; indicate, by using the information whose indication operation type is the first steering request included in the second operation field, the CP to perform go-online steering of the end user; and indicate, by using the identifier of the target UP included in the second operation attribute field, the CP to steer the end user to the target UP.

2. In a scenario of updating the SLA of the end user, the first operation field includes the information whose indication operation type is user SLA update. In the first request message, the second object field includes the user access information, the second operation field includes information whose indication operation type is a second steering request (steering request), and the second operation attribute field includes the identifier of the target UP. Specifically, when the CP updates the SLA of the end user, in the communication interface between the USF and the CP, the CP may indicate the to-be-scheduled end user to the USF by using the user access information and the SLA information that are included in the first object field; and indicate, by using the information whose indication operation type is user SLA update included in the first operation field, the USF to update the SLA of the end user. Then, in the communication interface between the USF and the CP, that is, in the first request message sent in step 303, the USF may indicate the currently scheduled end user to the CP by using the user access information in the second object field; indicate, by using the information whose indication operation type is the second steering request included in the second operation field, the CP to perform steering of the end user based on an updated SLA; and indicate, by using the identifier of the target UP included in the second operation attribute field, the CP to steer the end user to the target UP.

3. In a scenario of scheduling the end user to go offline, in the first message, the first object field includes the user access information, and the first operation field includes the information whose first indication operation type is user offline. In this case, it may be learned from step 302 that, the USF determines, as the target UP, the UP on which the end user who needs to be scheduled to go offline and who is corresponding to the user access information is currently located. The first request message sent by the USF to the CP in step 303 may be a notification message, used to notify the CP that the USF has deleted connection information corresponding to the terminal device. In addition, step 303 may not be performed when the CP schedules the end user to go offline.

304: The CP processes the connection between the end user and the target UP.

In this embodiment, after obtaining the identifier of the target UP in step 303, the CP may further process the connection between the end user and the target UP based on the identifier of the target UP.

Specifically, the CP 208 in FIG. 2 is used as an example. The CP 208 is a vBNG service control plane, processes a user dialup protocol, and interacts with an AAA server to perform user authentication, accounting, and authorization. The CP 208 may identify an SLA based on a user account, notify, by using access line information carried in the user dialup protocol, the USF 207 that a user goes online and waits for the USF to guide user steering, and notify the USF to map the user to a port accessed by a corresponding UP. In addition, the CP 208 delivers user entry information to the corresponding UP, and the corresponding UP generates a forwarding entry of the user and advertises a route. Corresponding to an implementation process in which the CP processes the connection between the end user and the target UP in step 304, that the CP processes the connection between the end user and the target UP based on the identifier of the target UP may specifically include: The CP sends an identifier of the end user to the target UP, so that the target UP knows to schedule the end user. This implements dynamic scheduling between the end user and the target UP.

In an optional step, in a process in which the CP processes the connection between the end user and the target UP in step 304, the CP may schedule the end user to an SF sub-interface corresponding to the target UP. An SDN controller may control the SF to schedule end users who access different SF sub-interfaces in the SF. Therefore, the CP may send a corresponding message to the SDN controller, to schedule the end user to the target UP. In this way, on a basis that a scheduling policy of the end user is determined in the BNG device via the USF, dynamic scheduling of the end user is implemented via the CP. This can reduce processing load of the control plane entity CP to some extent, and improve communication performance.

305: The CP sends a first response message to the USF.

In this embodiment, after the CP processes the connection between the end user and the target UP in step 304, the CP may send the first response message to the USF, where the first response message (steering ack) is used to indicate that the CP has processed the connection between the end user and the target UP. Step 305 is an optional step.

In this embodiment, in an interaction process between the CP and the USF in step 301 to step 305, for the CP, the CP sends the first message to the USF. The first message includes the end user information, and indicates the USF to schedule the end user based on the end user information. Then, the CP determines, based on the identifier of the target UP carried in the first request message sent by the USF, to schedule the end user to the target UP. In other words, a scheduling policy of the end user is determined via the USF. Then, the CP further processes the connection between the end user and the target UP based on the identifier of the end user and the target UP, so that the scheduling policy of the end user is determined in the BNG device via the USF. This reduces processing load of the control plane entity CP, and improves communication performance.

306: The USF determines a target SF associated with the end user.

In this embodiment, after receiving the first message from the CP in step 301, the USF further determines, based on the user access information carried in the first message, the target SF associated with the end user.

Specifically, in the network architecture shown in FIG. 2, the SF 202 device is added behind the AN 201 access network, and the layer 2 tunnel is established between the device and the UP. The physical interface accessed by the SF 202 and the AN 201 is divided into different sub-interfaces. The different sub-interfaces match different VLAN/QinQ ranges. In other words, the different sub-interfaces are corresponding to different layer 2 UP tunnels, and the end user accesses different UPs via different SFs. Therefore, the USF may determine, based on the user access information carried in the first message obtained in step 301, the target SF associated with the end user. Specifically, in step 301, the first message from the CP may carry an identifier of the target SF; another message sent by the CP to the USF carries an identifier of the target SF; or a mapping relationship between the end user and the SF is preset in the USF, and the USF determines the target SF from the mapping relationship. The target SF associated with the end user may alternatively be determined in another manner. This is not limited herein.

In addition, step 306 needs to be performed after step 301, and there is no necessary sequence relationship between step 306 and step 302 to step 305. This is not limited herein.

307: The USF sends a second request message to the SDN controller.

In this embodiment, the USF sends the second request message to the SDN controller. The USF may further determine, based on the first message obtained in step 301, an identifier of a target steering function entity SF associated with the end user and a virtual local area network VLAN identifier of the end user. Then, the USF sends the second request message to the SDN controller, where the second request message includes the VLAN identifier, the identifier of the target SF, and the identifier of the target UP.

It may be learned from step 301 and step 302 that the user access information may indicate one or more end users. Correspondingly, in step 307, the VLAN identifier determined by using the first message may also be corresponding to one or more end users. Specifically, in the implementation process of step 303, the identifier of the target UP is used to identify the target UP. During specific implementation, the identifier of the target UP may be an identifier of the target UP itself, or may be an identifier of an SF sub-interface corresponding to the target UP. This is not limited herein. Herein, an example in which the identifier of the SF sub-interface corresponding to the target UP is used as the identifier of the target UP is used for description. In this case, the SF sub-interface corresponding to the target UP is included in the target SF. Optionally, the second request message may further include an identifier of a source UP of the terminal device, and is used to indicate the SDN controller to schedule, in the target SF, an end user corresponding to the VLAN identifier out of a UP corresponding to the identifier of the source UP. Similarly, the identifier of the source UP is used to identify the UP that the terminal device originally accesses. Herein, the identifier of the source UP may be an identifier of the source UP itself, or may be an identifier of a source SF sub-interface corresponding to the source UP. This is not limited herein.

In a specific implementation, the USF and the SDN controller may exchange data through a second communication interface. The first communication interface may include a NETCONF, RESTFUL, or another communication interface, so that the USF and the SDN controller may align, through the second communication interface, content of messages transmitted between the USF and the SDN controller. This improves communication efficiency.

In a specific implementation, the second request message includes a third object field, a third operation field, and a third operation attribute field. Specifically, the USF and the SDN controller may communicate with each other through the NETCONF, RESTFUL, or another interface. An object field is used to indicate an identifier of an end user of an operation corresponding to a transmitted message, an operation field is used to indicate an operation type of the operation corresponding to the transmitted message, and an operation attribute field is used to indicate an operation port of the operation corresponding to the transmitted message. In the communication interface between the USF and the SDN controller, a data model that may be used includes at least three fields, namely, an object field, an operation field, and an operation attribute field. In this case, the second request message sent by the USF to the SDN controller may include the at least three fields, so that the USF and the SDN controller may align, based on the at least three fields, content of messages transmitted between the USF and the SDN controller. This improves communication efficiency. In this embodiment and subsequent embodiments, an example in which a message sent by the USF to the SDN controller includes the third object field, the third operation field, and the third operation attribute field is used for description.

It should be noted that, specifically, "align" means that when different communication devices exchange a message through a wired or wireless interface, the two communication devices have consistent understandings of a carrier frequency for receiving and sending the exchanged message, determining of a type of the exchanged message, meanings of field information carried in the exchanged message, or other configurations of the exchanged message. Specifically, the USF and the SDN controller may have consistent understandings of the meanings of the field information carried in the "at least three fields" based on the "at least three fields" carried in the message transmitted through the interface between the USF and the SDN controller.

Figure 5:
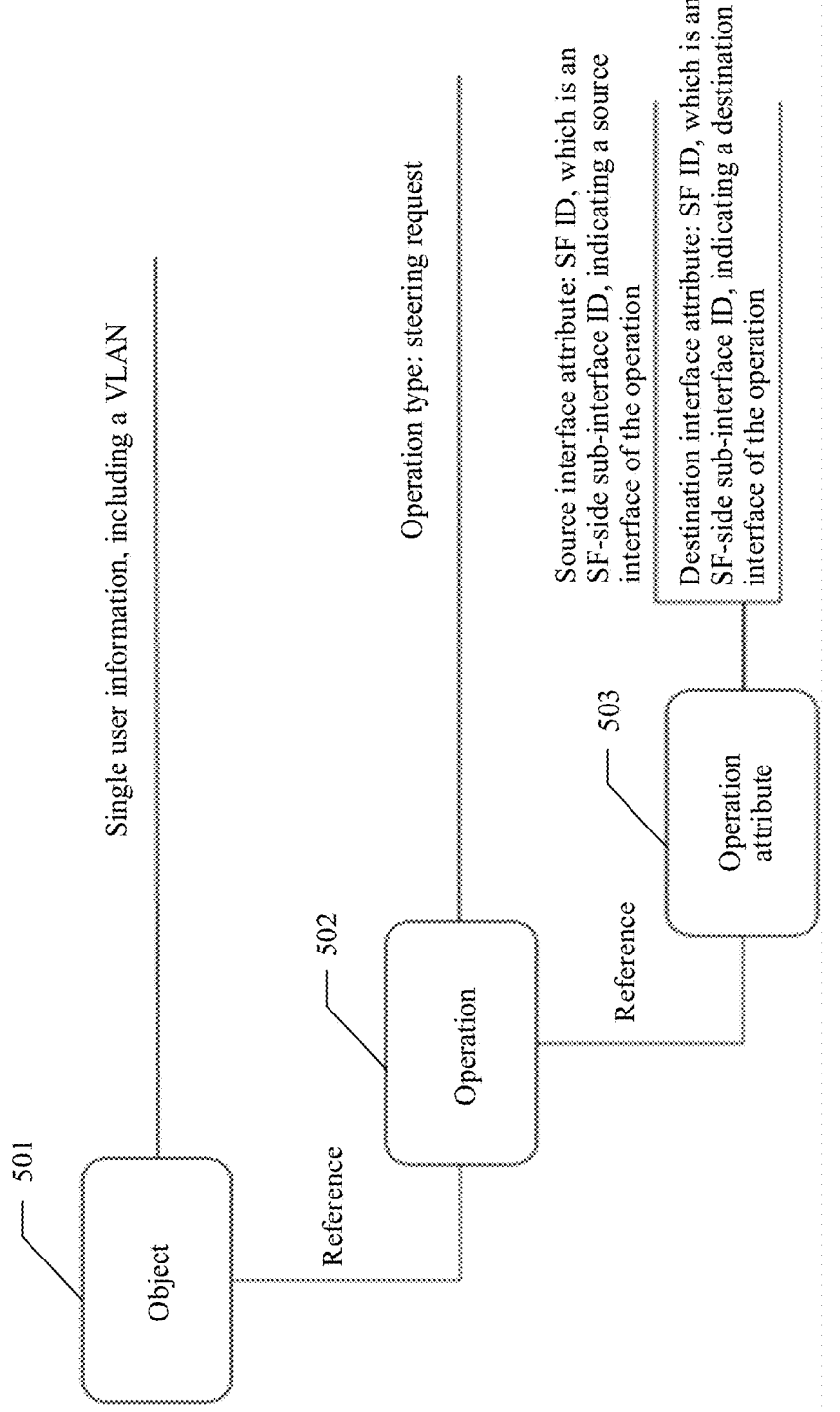
FIG. 5 is another schematic diagram of an embodiment of a communication method according to an embodiment of this application.

For example, the data model used by the communication interface between the USF and the SDN controller may be shown in FIG. 5. In the at least three fields of the data model of the interface between the USF and the SDN controller, an object 501, an operation 502, and an operation attribute 503 are used as examples for description. It is clear that the at least three fields may alternatively be represented by other names. For example, the object field, the operation field, and the operation attribute field may be represented by a terminal, an implementation, and an implementation attribute; the object field, the operation field, and the operation attribute field may be represented by an A field, a B field, and a C field; or the object field, the operation field, and the operation attribute field may be represented in another manner. This is not limited herein.

Specifically, in the second request message transmitted in step 307, the object 501 (namely, the object field) may carry the VLAN identifier. The following describes how different operation fields identified by the operation 502 are applied to different scenarios.

1. When the USF determines, based on the first message, to schedule the end user to go online, in the communication interface between the USF and the SDN controller, the USF may indicate the to-be-scheduled end user to the SDN controller by using the VLAN identifier included in the third object field; indicate, by using information whose indication operation type is a third steering request (steering request) included in the third operation field, the SDN controller to perform go-online steering of the end user; and indicate, by using the identifier of the target SF and the identifier of the target UP that are included in the third operation attribute field, the SDN controller to schedule, in the target SF, the end user to the target UP (source interface attribute: an SF ID, specifically, an SF-side sub-interface ID which may indicate a source interface of the operation; destination interface attribute: a target SF ID, specifically, an SF-side sub-interface ID which may indicate a destination interface of the operation).

2. When the USF determines, based on the first message, to update the connection of the end user, in the communication interface between the USF and the SDN controller, the USF may indicate the to-be-scheduled end user to the USF by using the VLAN identifier included in the third object field; indicate, by using information whose indication operation type is a fourth steering request (steering request) included in the third operation field, the SDN controller to perform steering of the end user based on an updated SLA; and indicate, by using the identifier of the target SF and the identifier of the target UP that are included in the third operation attribute field, the SDN controller to schedule, in the target SF, the end user to the target UP (source interface attribute: an SF ID, specifically, an SF-side sub-interface ID which may indicate a source interface of the operation; destination interface attribute: a target SF ID, specifically, an SF-side sub-interface ID which may indicate a destination interface of the operation).

In this embodiment, in a process of scheduling the end user to the target UP, the end user may be scheduled to an SF sub-interface corresponding to the target UP. The SDN controller may control the SF to schedule end users who access different SF sub-interfaces in the SF. Therefore, the USF may schedule the end user to the target UP via the SDN controller by using the second request message. In this way, on a basis that a scheduling policy of the end user is determined in the BNG device via the USF, dynamic scheduling of the end user is also implemented via the USF. This can further reduce processing load of the control plane entity CP, and improve communication performance.

308: The SDN controller sends a third request message to the SF.

In this embodiment, after the SDN controller receives the second request message from the USF in step 307, the SDN controller processes, in the target SF, the connection between the end user corresponding to the VLAN identifier and the target UP based on the second request message.

It can be learned from the content of step 307 that the VLAN identifier may correspondingly identify one or more end users. Specifically, a process in which the SDN controller processes, in the target SF, the connection between the end user corresponding to the VLAN identifier and the target UP based on the second request message may be: The SDN controller generates the third request message and sends the third request message to the SF, where the third request message includes the VLAN identifier of the end user and the identifier of the target UP.

In this embodiment, the network architecture shown in FIG. 2 is used as an example. The BNG may further include the steering function entity SF. There may be a plurality of different SF sub-interfaces in the SF, and the different SF sub-interfaces are corresponding to different layer 2 UP tunnels. In other words, the end user accesses different UPs via different SFs. Therefore, as a controller of the SF, after receiving the second request message from the USF, the SDN controller may process the connection between the end user and the target UP based on the second request message by performing step 308 to step 310.

In a specific implementation, the SDN controller and the SF may exchange data through a third communication interface. The first communication interface may include a NETCONF, RESTFUL, or another communication interface, so that the SDN controller and the SF controller may align, through the third communication interface, content of messages transmitted between the SDN controller and the SF controller. This improves communication efficiency.

In a specific implementation, the third request message includes a fourth object field, a fourth operation field, and a fourth operation attribute field. Specifically, the SDN controller and the SF may communicate with each other through the NETCONF, RESTFUL, or another interface. An object field is used to indicate an identifier of an end user of an operation corresponding to a transmitted message, an operation field is used to indicate an operation type of the operation corresponding to the transmitted message, and an operation attribute field is used to indicate an operation port of the operation corresponding to the transmitted message. In this embodiment, in a communication interface between the SDN controller and the SF, a data model that may be used includes at least three fields, namely, an object field, an operation field, and an operation attribute field. In this case, the third request message sent by the SDN controller to the SF may include the at least three fields, so that the SDN controller and the SF may align, based on the at least three fields, content of messages transmitted between the SDN controller and the SF. This improves communication efficiency. In this embodiment and subsequent embodiments, an example in which a message sent by the SDN controller to the SF includes the fourth object field, the fourth operation field, and the fourth operation attribute field is used for description.

It should be noted that, specifically, "align" means that when different communication devices exchange a message through a wired or wireless interface, the two communication devices have consistent understandings of a carrier frequency for receiving and sending the exchanged message, determining of a type of the exchanged message, meanings of field information carried in the exchanged message, or other configurations of the exchanged message. Specifically, the SDN controller and the SF may have consistent understandings of the meanings of the field information carried in the "at least three fields" based on the "at least three fields" carried in the message transmitted through the interface between the SDN controller and the SF.

Figure 6:
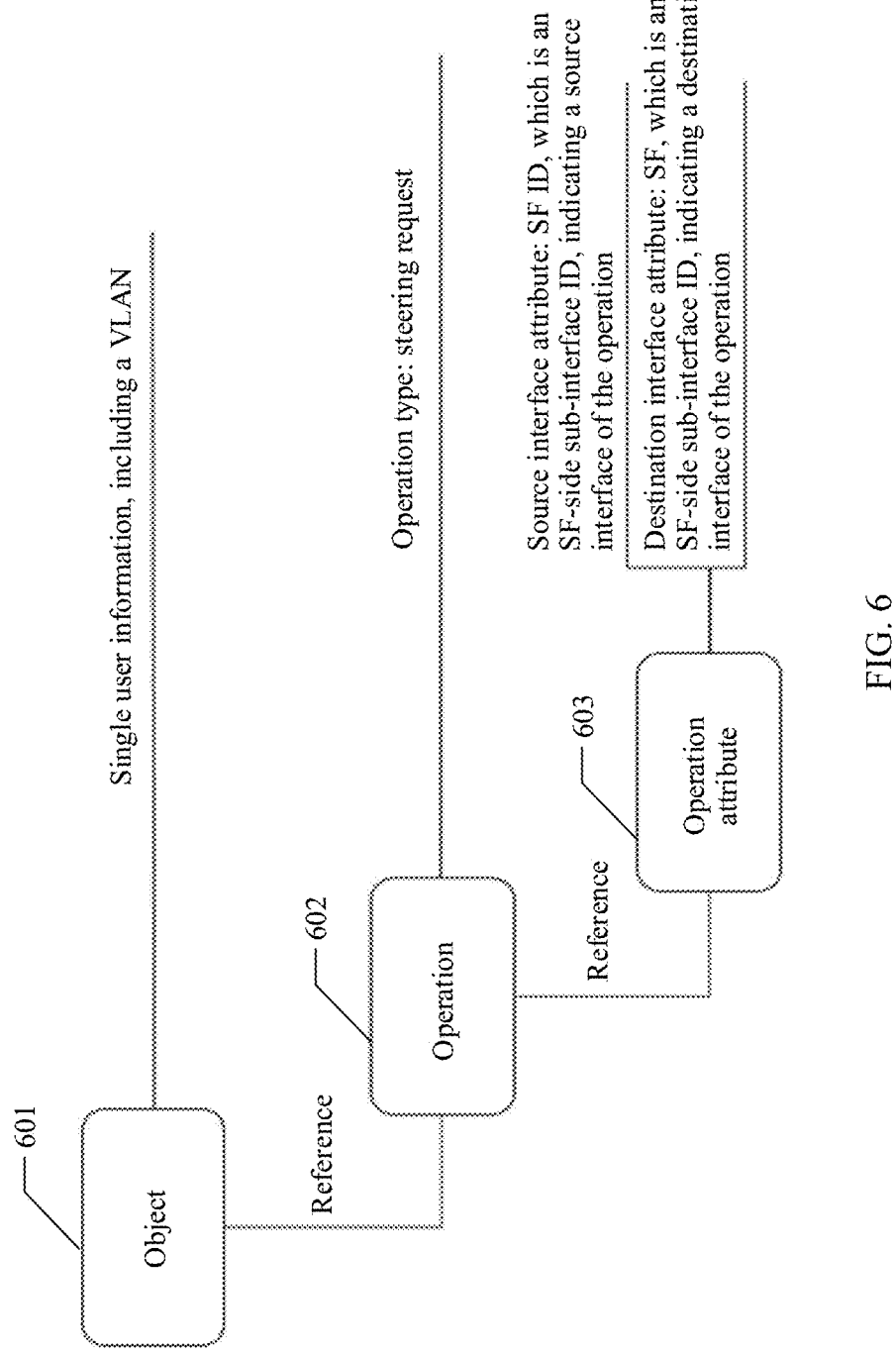
FIG. 6 is another schematic diagram of an embodiment of a communication method according to an embodiment of this application.

For example, the data model used by the communication interface between the SDN controller and the SF may be shown in FIG. 6. In the at least three fields of the data model of the interface between the SDN controller and the SF, the object field, the operation field, and the operation attribute field are described by using an object 601, an operation 602, and an operation attribute 603 as examples. It is clear that the at least three fields may alternatively be represented by other names. For example, the object field, the operation field, and the operation attribute field may be represented by a terminal, an implementation, and an implementation attribute; the object field, the operation field, and the operation attribute field may be represented by an A field, a B field, and a C field; or the object field, the operation field, and the operation attribute field may be represented in another manner. This is not limited herein.

In addition, in step 307, the USF may send different second request messages to the SDN controller, to support different processes of scheduling the end user to implement a connection. Therefore, in step 308, the SDN controller may also send the third request message to the SF in a plurality of manners. Details are described below.

1. In a scenario in which the SDN controller schedules an end user to go online, to be specific, the second request message obtained in step 307 carries the information whose indication operation type is the third steering request, in this case, in the third request message, the fourth object field includes the VLAN identifier, the fourth operation field includes information whose indication operation type is a fifth steering request, and the fourth operation attribute field includes the identifier of the target UP. Specifically, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform go-online steering of the end user; and indicate, by using the identifier of the target UP included in the third operation attribute field, the SF to schedule the end user to the target UP (source interface attribute: an SF ID, specifically, an SF-side sub-interface ID which may indicate a source interface of the operation; destination interface attribute: a target SF ID, specifically, an SF-side sub-interface ID which may indicate a destination interface of the operation). This implements scheduling of an online connection of the end user in the BNG.

2. In a scenario in which the SDN controller updates a connection of the end user, to be specific, the second request message obtained in step 307 carries the information whose indication operation type is the fourth steering request, in this case, in the third request message, the fourth object field includes the VLAN identifier, the fourth operation field includes information whose indication operation type is a sixth steering request, and the fourth operation attribute field includes the identifier of the target UP. Specifically, in the communication interface between the SDN controller and the SF, the SDN controller may indicate the to-be-scheduled end user to the SF by using the VLAN identifier included in the fourth object field; indicate, by using the information whose indication operation type is the fifth steering request included in the fourth operation field, the SF to perform steering of the end user based on an updated SLA; and indicate, by using the identifier of the target UP included in the third operation attribute field, the SF to schedule the end user to the target UP (source interface attribute: an SF ID, specifically, an SF-side sub-interface ID which may indicate a source interface of the operation; destination interface attribute: a target SF ID, specifically, an SF-side sub-interface ID which may indicate a destination interface of the operation). This implements scheduling of connection update of the end user in the BNG.

309: The SF processes the connection between the end user and the target UP.

In this embodiment, after the SF obtains the identifier of the target UP and the identifier of the end user in step 308, the SF processes the connection between the end user and the target UP.

Specifically, the SF includes a plurality of SF interfaces, which include the target UP, and different SF interfaces are corresponding to different UPs. An execution process of step 309 is specifically: The SF processes connections between the end user and the plurality of SF interfaces.

In addition, in step 308, the SDN controller may send different third request messages to the SF, to support different processes of scheduling the end user to implement a connection. Therefore, in step 309, the SF may also implement different scheduling processes by using different third request messages. Details are described below.

1. In a scenario in which the SDN controller schedules an end user to go online, in the third request message, the fourth object field includes the VLAN identifier, the fourth operation field includes the information whose indication operation type is the fifth steering request, and the fourth operation attribute field includes the identifier of the target UP. In this case, in step 309, the SF schedules the end user to go online from the target UP, so that go-online scheduling of the end user is implemented in the BNG.

2. In a scenario in which the SDN controller schedules connection update of the end user, in the third request message, the fourth object field includes the VLAN identifier, the fourth operation field includes the information whose indication operation type is the sixth steering request, and the fourth operation attribute field includes the identifier of the target UP. In this case, the SF schedules the end user to the target UP in step 309. This implements scheduling of connection update of the end user in the BNG.

310: The SF sends a third response message to the SDN controller.

In this embodiment, after the SF performs step 309, the SF may send the third response message to the SDN controller, where the third response message is used to indicate that the SF has processed the connection between the end user and the target UP. Step 310 is an optional step.

311: The SDN controller sends a second response message to the USF.

In this embodiment, after the SDN controller receives the third response message from the SF in step 310, the SDN controller sends the second response message to the USF, where the second response message is used to indicate that the SDN controller has processed the connection between the end user and the target UP in the target SF. Step 311 is an optional step.

In this embodiment, by using a process of step 306 to step 311, in a process of scheduling the end user to the target UP, the end user may be scheduled to an SF sub-interface corresponding to the target UP. The SDN controller may control the SF to schedule end users who access different SF sub-interfaces in the SF. Therefore, the USF may schedule the end user to the target UP via the SDN controller by using the second request message. In this way, on a basis that a scheduling policy of the end user is determined in the BNG device via the USF (in step 301 to step 305), dynamic scheduling of the end user is also implemented via the USF. This can further reduce processing load of the control plane entity CP, and improve communication performance.

In this embodiment, an interface and a data model between the USF/CP/SDN/SF are specifically refined, and users are distinguished based on SLAs. This breaks through a limitation of a fixed user access gateway in an existing network and resolves a problem that user SLAs can only be distinguished on a single SF. According to the solution of the present invention, a user can dynamically access different SFs. This can not only enable operators to provide differentiated services and obtain more benefits, but also adjust SF load.

The foregoing describes the communication method in the embodiments of this application. The following describes a communication apparatus provided in an embodiment of this application with reference to accompanying drawings.

Figure 7:
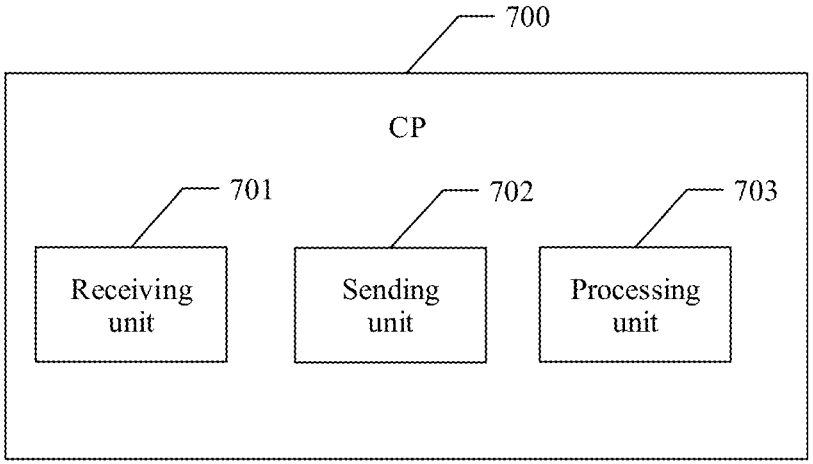
FIG. 7 is a schematic diagram of an embodiment of a control plane entity CP according to an embodiment of this application.

Refer to FIG. 7. A control plane entity CP 700 according to an embodiment of this application is provided. The control plane entity CP 700 may be the CP 101 in the embodiment shown in FIG. 1, the CP 208 in the embodiment shown in FIG. 2, and the CP in the embodiment shown in FIG. 3.

In a specific implementation, the control plane entity CP 700 includes:

a sending unit 702, configured to send a first message to a USF, where the first message includes end user information, and the end user information includes user access information and service level agreement SLA information; for a specific implementation, refer to detailed descriptions of step 301 in the embodiment shown in FIG. 3, and details are not described herein again;

a receiving unit 701, configured to receive a first request message from the USF, where the first request message includes an identifier of a target UP, and the target UP is associated with an end user; for a specific implementation, refer to detailed descriptions of step 303 in the embodiment shown in FIG. 3, and details are not described herein again; and a processing unit 703, configured to process a connection between the end user and the target UP based on the identifier of the target UP; for a specific implementation, refer to detailed descriptions of step 304 in the embodiment shown in FIG. 3, and details are not described herein again.

In a specific implementation, the first message includes a first object field, a first operation field, and a first operation attribute field.

The first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information and the SLA information, the SLA information includes initial SLA information, and the first operation field includes information whose indication operation type is user online.

In the first request message, the second object field includes the user access information, the second operation field includes information whose indication operation type is a first steering request, and the second operation attribute field includes the identifier of the target UP. For a specific implementation, refer to detailed descriptions in the embodiment shown in FIG. 4, and details are not described herein again.

In a specific implementation, in the first message, the first object field includes the user access information and the SLA information, the SLA information includes SLA update information, and the first operation field includes information whose indication operation type is user SLA update.

In the first request message, the second object field includes the user access information, the second operation field includes information whose indication operation type is a second steering request, and the second operation attribute field includes the identifier of the target UP. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID.

In a specific implementation, the user access information further includes at least one of the following:

network segment information, a group UP ID, and an access interface ID. For a specific implementation, refer to detailed descriptions in the embodiment shown in FIG. 4, and details are not described herein again.

In addition, in another specific implementation, the control plane entity CP 700 includes:

a receiving unit 701, configured to obtain a go-offline request message, where the go-offline request message includes end user information, and the end user information includes user access information; and a sending unit 702, configured to send a first message to a USF, where the first message includes information whose first indication operation type is user offline and the user access information. For a specific implementation, refer to detailed descriptions of step 301 in the embodiment shown in FIG. 3, and details are not described herein again.

In a specific implementation, the first message may include a first object field, a first operation field, and a first operation attribute field, and the first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information, and the first operation field includes the information whose first indication operation type is user offline. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following:

network segment information, a group UP ID, and an access interface ID. For a specific implementation, refer to detailed descriptions in the embodiment shown in FIG. 4, and details are not described herein again.

It should be noted that for specific content such as an information execution process of the units of the control plane entity CP 700, refer to descriptions in the foregoing method embodiments of this application. Details are not described herein again.

Figure 8:
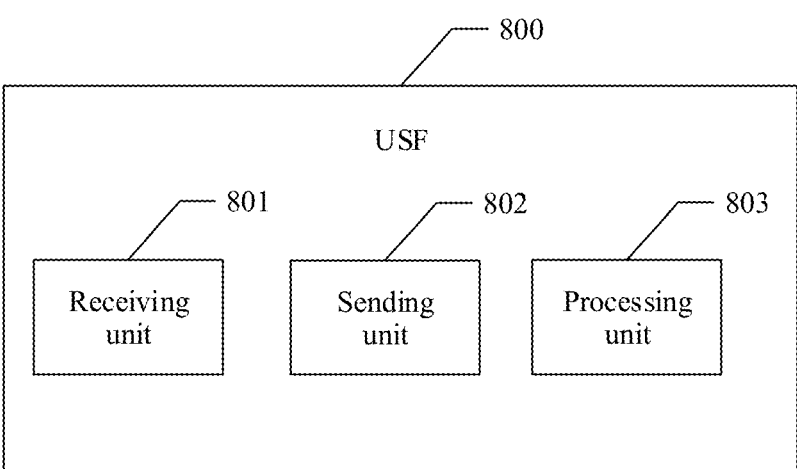
FIG. 8 is a schematic diagram of an embodiment of a user plane steering function entity USF according to an embodiment of this application.

Refer to FIG. 8. A user plane steering function entity USF 800 according to an embodiment of this application is provided. The USF 800 may be the USF 207 in the embodiment shown in FIG. 2 and the USF in the embodiment shown in FIG. 3.

In a specific implementation, the user plane steering function entity USF 800 may include:

a receiving unit 801, configured to receive a first message from a CP, where the first message includes end user information, and the end user information includes user access information and service level agreement SLA information; for a specific implementation, refer to detailed descriptions of step 301 in the embodiment shown in FIG. 3, and details are not described herein again;

a processing unit 803, configured to determine, based on the first message, a target UP associated with an end user; for a specific implementation, refer to detailed descriptions of step 302 in the embodiment shown in FIG. 3, and details are not described herein again; and a sending unit 802, configured to send a first request message to the CP, where the first request message includes an identifier of the target UP; for a specific implementation, refer to detailed descriptions of step 303 in the embodiment shown in FIG. 3, and details are not described herein again.

In a specific implementation, the first message includes a first object field, a first operation field, and a first operation attribute field.

The first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information and the SLA information, the SLA information includes initial SLA information, and the first operation field includes information whose indication operation type is user online.

In the first request message, the second object field includes the user access information, the second operation field includes information whose indication operation type is a first steering request, and the second operation attribute field includes the identifier of the target UP. For a specific implementation, refer to detailed descriptions in the embodiment shown in FIG. 4, and details are not described herein again.

In a specific implementation, in the first message, the first object field includes the user access information and the SLA information, the SLA information includes SLA update information, and the first operation field includes information whose indication operation type is user SLA update.

In the first request message, the second object field includes the user access information, the second operation field includes information whose indication operation type is a second steering request, and the second operation attribute field includes the identifier of the target UP. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following: network segment information, a group UP ID, and an access interface ID. For a specific implementation, refer to detailed descriptions in the embodiment shown in FIG. 4, and details are not described herein again.

In a specific implementation, the BNG further includes a software-defined network SDN controller.

The processing unit 803 is further configured to determine, based on the first message, an identifier of a target steering function entity SF associated with the end user and a virtual local area network VLAN identifier of the end user. For a specific implementation, refer to detailed descriptions of step 306 in the embodiment shown in FIG. 3, and details are not described herein again.

The sending unit 802 is further configured to send a second request message to the SDN controller, where the second request message includes the VLAN identifier, the identifier of the target SF, and the identifier of the target UP. For a specific implementation, refer to detailed descriptions of step 307 in the embodiment shown in FIG. 3, and details are not described herein again.

In a specific implementation, the second request message includes a third object field, a third operation field, and a third operation attribute field. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a third steering request, and the third operation attribute field includes the identifier of the target SF and the identifier of the target UP. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a fourth steering request, and the third operation attribute field includes the identifier of the target SF and the identifier of the target UP. For a specific implementation, refer to detailed descriptions in the embodiment shown in FIG. 5, and details are not described herein again.

In addition, in another specific implementation, the USF 800 includes: a receiving unit 801, configured to receive a first message from a CP, where the first message includes information whose first indication operation type is user offline and the user access information; for a specific implementation, refer to detailed descriptions of step 301 in the embodiment shown in FIG. 3, and details are not described herein again; and a processing unit 803, configured to determine, based on the first message, a target UP associated with an end user, an identifier of a target steering function entity SF associated with the end user and a virtual local area network VLAN identifier of the end user; for a specific implementation, refer to detailed descriptions of step 302 in the embodiment shown in FIG. 3, and details are not described herein again.

The processing unit 803 is further configured to delete connection information corresponding to the end user. For a specific implementation, refer to detailed descriptions of step 303 in the embodiment shown in FIG. 3, and details are not described herein again.

In a specific implementation, the first message includes a first object field, a first operation field, and a first operation attribute field, and the first request message includes a second object field, a second operation field, and a second operation attribute field. For a specific implementation, refer to detailed descriptions in the embodiment shown in FIG. 4, and details are not described herein again.

In a specific implementation, this embodiment may be applied to a scenario in which the CP schedules an end user to go offline. In this case, in the first message, the first object field includes the user access information, and the first operation field includes the information whose first indication operation type is user offline. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following: network segment information, a group UP ID, and an access interface ID. For a specific implementation, refer to detailed descriptions in the embodiment shown in FIG. 4, and details are not described herein again.

It should be noted that for specific content such as an information execution process of the units of the user plane steering function entity USF 800, refer to descriptions in the foregoing method embodiments of this application. Details are not described herein again.

Figure 9:
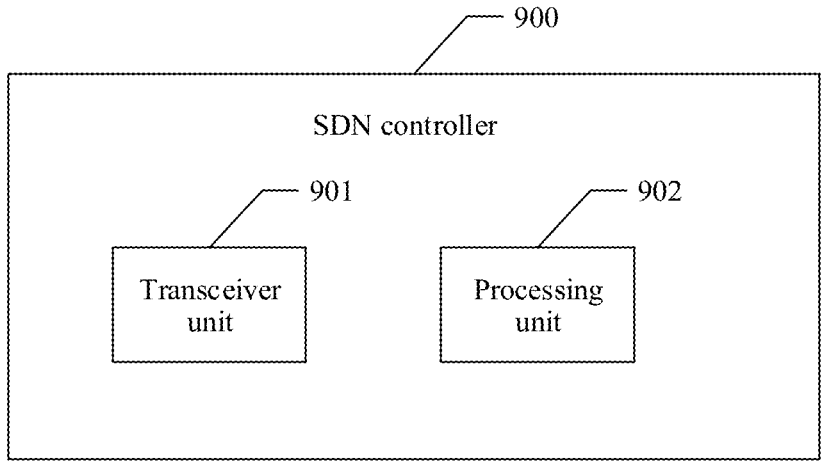
FIG. 9 is a schematic diagram of an embodiment of a software-defined network SDN controller according to an embodiment of this application.

Refer to FIG. 9. A software-defined network SDN controller 900 according to an embodiment of this application is provided. The SDN controller 900 may be the SDN controller 206 in the embodiment shown in FIG. 2 and the SDN controller in the embodiment shown in FIG. 3.

In a specific implementation, the SDN controller 900 may include:

a transceiver unit 901, configured to receive a second request message from a USF, where the second request message includes a virtual local area network VLAN identifier, an identifier of a target SF, and an identifier of a target UP; for a specific implementation, refer to detailed descriptions of step 307 in the embodiment shown in FIG. 3, and details are not described herein again; and a processing unit 902, configured to process, in the target SF, a connection between an end user corresponding to the virtual local area network VLAN identifier and the target UP based on the second request message; for a specific implementation, refer to detailed descriptions of step 308 in the embodiment shown in FIG. 3, and details are not described herein again.

In a specific implementation, the second request message includes a third object field, a third operation field, and a third operation attribute field. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a third steering request, and the third operation attribute field includes the identifier of the target SF and the identifier of the target UP. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a fourth steering request, and the third operation attribute field includes the identifier of the target SF and the identifier of the target UP. For a specific implementation, refer to detailed descriptions in the embodiment shown in FIG. 5, and details are not described herein again.

In a specific implementation, the BNG further includes the target SF. That the SDN controller processes, in the target SF, a connection between an end user corresponding to the virtual local area network VLAN identifier and the target UP based on the second request message includes:

The SDN controller sends a third request message to the target SF, where the third request message includes the VLAN identifier and the identifier of the target UP. For a specific implementation, refer to detailed descriptions of step 308 in the embodiment shown in FIG. 3, and details are not described herein again.

In a specific implementation, the third request message includes a fourth object field, a fourth operation field, and a fourth operation attribute field. For a specific implementation, refer to detailed descriptions in the embodiment shown in FIG. 6, and details are not described herein again.

In a specific implementation, in the third request message, the fourth object field includes the VLAN identifier, the fourth operation field includes information whose indication operation type is a fifth steering request, and the fourth operation attribute field includes the identifier of the target UP. For a specific implementation, refer to detailed descriptions in the embodiment shown in FIG. 6, and details are not described herein again.

In a specific implementation, in the third request message, the fourth object field includes the VLAN identifier, the fourth operation field includes information whose indication operation type is a sixth steering request, and the fourth operation attribute field includes the identifier of the target UP. For a specific implementation, refer to detailed descriptions in the embodiment shown in FIG. 6, and details are not described herein again.

It should be noted that for specific content such as an information execution process of the units of the SDN controller 900, refer to descriptions in the foregoing method embodiments of this application. Details are not described herein again.

Figure 10:
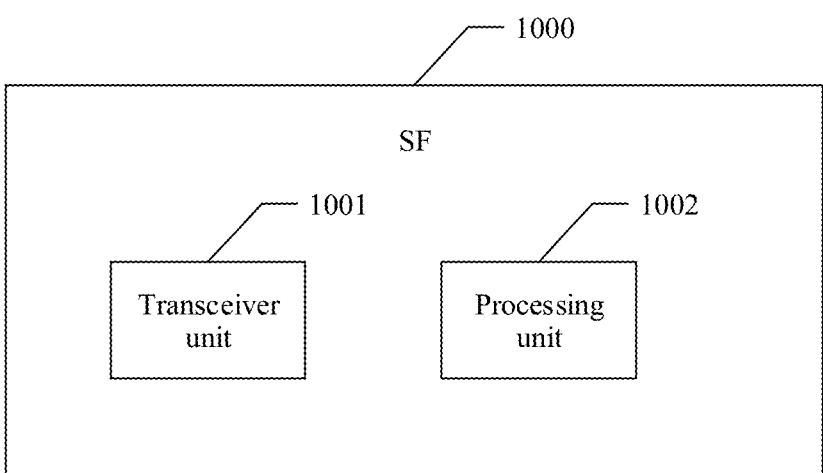
FIG. 10 is a schematic diagram of an embodiment of an access network element SF according to an embodiment of this application.

Refer to FIG. 10. A steering function entity SF 1000 according to an embodiment of this application is provided. The steering function entity SF 1000 may be the SF 202 in the embodiment shown in FIG. 2 and the SF in the embodiment shown in FIG. 3.

In a specific implementation, the SF 1000 may include:

a transceiver unit 1001, configured to receive a third request message from an SDN controller, where the third request message includes an identifier of an end user and an identifier of a target UP; for a specific implementation, refer to detailed descriptions of step 308 in the embodiment shown in FIG. 3, and details are not described herein again; and a processing unit 1002, configured to process a connection between the end user and the target UP based on the third request message; for a specific implementation, refer to detailed descriptions of step 309 in the embodiment shown in FIG. 3, and details are not described herein again.

In a specific implementation, the third request message includes a fourth object field, a fourth operation field, and a fourth operation attribute field. For a specific implementation, refer to detailed descriptions in the embodiment shown in FIG. 6, and details are not described herein again.

In a specific implementation, in the third request message, the fourth object field includes a VLAN identifier, the fourth operation field includes information whose indication operation type is a fifth steering request, and the fourth operation attribute field includes the identifier of the target UP. For a specific implementation, refer to detailed descriptions in the embodiment shown in FIG. 6, and details are not described herein again.

In a specific implementation, in the third request message, the fourth object field includes a VLAN identifier, the fourth operation field includes information whose indication operation type is a sixth steering request, and the fourth operation attribute field includes the identifier of the target UP. For a specific implementation, refer to detailed descriptions in the embodiment shown in FIG. 6, and details are not described herein again.

It should be noted that for specific content such as an information execution process of the units of the SF 1000, refer to descriptions in the foregoing method embodiments of this application. Details are not described herein again.

Figure 11:
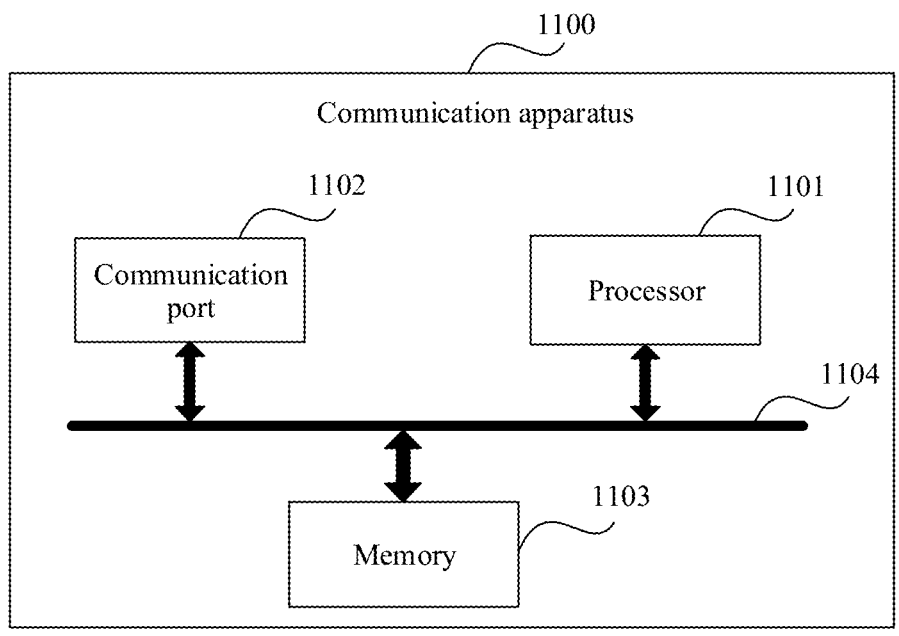
FIG. 11 is a schematic diagram of an embodiment of a communication apparatus according to an embodiment of this application.

FIG. 11 is a schematic diagram of a specific logical structure of a communication apparatus 1100 in the foregoing embodiments according to an embodiment of this application. The communication apparatus 1100 may include but is not limited to a processor 1101, a communication port 1102, a memory 1103, and a bus 1104. In this embodiment of this application, the processor 1101 is configured to control and process an action of the communication apparatus 1100.

In a specific implementation, the communication apparatus 1100 is configured to perform functions implemented by the CP 101 in FIG. 1, the CP 208 in FIG. 2, the CP in FIG. 3, and the CP 700 in FIG. 7 in the foregoing embodiments. In addition, when the units in the embodiment shown in FIG. 7 are functional modules implemented by software, these software functional modules may be stored in the memory 1103. When the processor 1101 executes software code in the memory 1103, the control plane entity CP is enabled to perform the following steps:

sending a first message to a USF, where the first message includes end user information, and the end user information includes user access information and service level agreement SLA information; for a specific implementation, refer to detailed descriptions of step 301 in the embodiment shown in FIG. 3, and details are not described herein again;

receiving a first request message from the USF, where the first request message includes an identifier of a target UP, and the target UP is associated with an end user; for a specific implementation, refer to detailed descriptions of step 303 in the embodiment shown in FIG. 3, and details are not described herein again; and processing a connection between the end user and the target UP based on the identifier of the target UP; for a specific implementation, refer to detailed descriptions of step 304 in the embodiment shown in FIG. 3, and details are not described herein again.

In a specific implementation, the first message includes a first object field, a first operation field, and a first operation attribute field.

The first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information and the SLA information, the SLA information includes initial SLA information, and the first operation field includes information whose indication operation type is user online.

In the first request message, the second object field includes the user access information, the second operation field includes information whose indication operation type is a first steering request, and the second operation attribute field includes the identifier of the target UP. For a specific implementation, refer to detailed descriptions in the embodiment shown in FIG. 4, and details are not described herein again.

In a specific implementation, in the first message, the first object field includes the user access information and the SLA information, the SLA information includes SLA update information, and the first operation field includes information whose indication operation type is user SLA update.

In the first request message, the second object field includes the user access information, the second operation field includes information whose indication operation type is a second steering request, and the second operation attribute field includes the identifier of the target UP. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following:

network segment information, a group UP ID, and an access interface ID. For a specific implementation, refer to detailed descriptions in the embodiment shown in FIG. 4, and details are not described herein again.

In addition, in another specific implementation, the control plane entity CP is further configured to perform the following steps:

obtaining a go-offline request message, where the go-offline request message includes end user information, and the end user information includes user access information; and sending a first message to a USF, where the first message includes information whose first indication operation type is user offline and the user access information. For a specific implementation, refer to detailed descriptions of step 301 in the embodiment shown in FIG. 3, and details are not described herein again.

In a specific implementation, the first message may include a first object field, a first operation field, and a first operation attribute field, and the first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information, and the first operation field includes information whose first indication operation type is user offline. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following:

network segment information, a group UP ID, and an access interface ID. For a specific implementation, refer to detailed descriptions in the embodiment shown in FIG. 4, and details are not described herein again.

It should be noted that for specific content such as an execution process of the control plane CP, refer to descriptions in the foregoing method embodiments of this application. Details are not described herein again.

In a specific implementation, the communication apparatus 1100 is configured to perform functions implemented by the USF 207 in FIG. 2, the USF in FIG. 3, and the USF 800 in FIG. 8 in the foregoing embodiments. In addition, when the units in the embodiment shown in FIG. 8 are functional modules implemented by software, these software functional modules may be stored in the memory 1103. When the processor 1101 executes software code in the memory 1103, the control plane entity CP is enabled to perform the following steps:

receiving a first message from the CP, where the first message includes end user information, and the end user information includes user access information and service level agreement SLA information; for a specific implementation, refer to detailed descriptions of step 301 in the embodiment shown in FIG. 3, and details are not described herein again;

determining, based on the first message, a target UP associated with an end user; for a specific implementation, refer to detailed descriptions of step 302 in the embodiment shown in FIG. 3, and details are not described herein again; and sending a first request message to the CP, where the first request message includes an identifier of the target UP; for a specific implementation, refer to detailed descriptions of step 303 in the embodiment shown in FIG. 3, and details are not described herein again.

In a specific implementation, the first message includes a first object field, a first operation field, and a first operation attribute field.

The first request message includes a second object field, a second operation field, and a second operation attribute field. For a specific implementation, refer to detailed descriptions in the embodiment shown in FIG. 4, and details are not described herein again.

In a specific implementation, in the first message, the first object field includes the user access information and the SLA information, the SLA information includes initial SLA information, and the first operation field includes information whose indication operation type is user online.

In the first request message, the second object field includes the user access information, the second operation field includes information whose indication operation type is a first steering request, and the second operation attribute field includes the identifier of the target UP. For a specific implementation, refer to detailed descriptions in the embodiment shown in FIG. 4, and details are not described herein again.

In a specific implementation, in the first message, the first object field includes the user access information and the SLA information, the SLA information includes SLA update information, and the first operation field includes information whose indication operation type is user SLA update.

In the first request message, the second object field includes the user access information, the second operation field includes information whose indication operation type is a second steering request, and the second operation attribute field includes the identifier of the target UP.

For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following:

network segment information, a group UP ID, and an access interface ID. For a specific implementation, refer to detailed descriptions in the embodiment shown in FIG. 4, and details are not described herein again.

In a specific implementation, the USF is further configured to:

determining, based on the first message, an identifier of a target steering function entity SF associated with the end user and a virtual local area network VLAN identifier of the end user; and sending a second request message to an SDN controller, where the second request message includes the VLAN identifier, the identifier of the target SF, and the identifier of the target UP. For a specific implementation, refer to detailed descriptions of step 307 in the embodiment shown in FIG. 3, and details are not described herein again.

In a specific implementation, the second request message includes a third object field, a third operation field, and a third operation attribute field. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a third steering request, and the third operation attribute field includes the identifier of the target SF and the identifier of the target UP. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a fourth steering request, and the third operation attribute field includes the identifier of the target SF and the identifier of the target UP. For a specific implementation, refer to detailed descriptions in the embodiment shown in FIG. 5, and details are not described herein again.

In addition, in another specific implementation, the USF is further configured to perform the following steps:

receiving a first message from a CP, where the first message includes information whose first indication operation type is user offline and the user access information; for a specific implementation, refer to detailed descriptions of step 301 in the embodiment shown in FIG. 3, and details are not described herein again;

determining, based on the first message, a target UP associated with an end user, an identifier of a target steering function entity SF associated with the end user and a virtual local area network VLAN identifier of the end user; for a specific implementation, refer to detailed descriptions of step 302 in the embodiment shown in FIG. 3, and details are not described herein again; and deleting connection information corresponding to the end user; for a specific implementation, refer to detailed descriptions of step 302 in the embodiment shown in FIG. 3, and details are not described herein again.

In a specific implementation, the first message includes a first object field, a first operation field, and a first operation attribute field, and the first request message includes a second object field, a second operation field, and a second operation attribute field. For a specific implementation, refer to detailed descriptions in the embodiment shown in FIG. 4, and details are not described herein again.

In a specific implementation, this embodiment may be applied to a scenario in which the CP schedules an end user to go offline. In this case, in the first message, the first object field includes the user access information, and the first operation field includes information whose first indication operation type is user offline. For a specific implementation, refer to detailed descriptions in the embodiment shown in FIG. 4, and details are not described herein again.

In a specific implementation, the user access information includes a steering function entity SF identity ID, media access control layer MAC information, QinQ information, and an initial user plane entity UP ID. For a specific implementation, refer to detailed descriptions in the embodiment shown in FIG. 4, and details are not described herein again.

In a specific implementation, the user access information further includes at least one of the following:

network segment information, a group UP ID, and an access interface ID. For a specific implementation, refer to detailed descriptions in the embodiment shown in FIG. 4, and details are not described herein again.

It should be noted that for specific content such as an information execution process of the units of the user plane steering function entity USF 800, refer to descriptions in the foregoing method embodiments of this application. Details are not described herein again.

In a specific implementation, the communication apparatus 1100 is configured to perform functions implemented by the SDN controller 206 in FIG. 2, the SDN controller in FIG. 3, and the SDN controller 900 in FIG. 9 in the foregoing embodiments. In addition, when the units in the embodiment shown in FIG. 9 are functional modules implemented by software, these software functional modules may be stored in the memory 1103. When the processor 1101 executes software code in the memory 1103, the SDN controller is enabled to perform the following steps:

receiving a second request message from a USF, where the second request message includes a virtual local area network VLAN identifier, an identifier of a target SF, and an identifier of a target UP; for a specific implementation, refer to detailed descriptions of step 307 in the embodiment shown in FIG. 3, and details are not described herein again; and processing, in the target SF, a connection between an end user corresponding to the virtual local area network VLAN identifier and the target UP based on the second request message; for a specific implementation, refer to detailed descriptions of step 308 in the embodiment shown in FIG. 3, and details are not described herein again.

In a specific implementation, the second request message includes a third object field, a third operation field, and a third operation attribute field. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a third steering request, and the third operation attribute field includes the identifier of the target SF and the identifier of the target UP. For a specific implementation, refer to detailed descriptions in the embodiment shown in FIG. 5, and details are not described herein again.

In a specific implementation, in the second request message, the third object field includes the VLAN identifier, the third operation field includes information whose indication operation type is a fourth steering request, and the third operation attribute field includes the identifier of the target SF and the identifier of the target UP. For a specific implementation, refer to detailed descriptions in the embodiment shown in FIG. 5, and details are not described herein again.

In a specific implementation, the BNG further includes the target SF. That the SDN controller processes, in the target SF, a connection between an end user corresponding to the virtual local area network VLAN identifier and the target UP based on the second request message includes:

The SDN controller sends a third request message to the target SF, where the third request message includes the VLAN identifier and the identifier of the target UP. For a specific implementation, refer to detailed descriptions of step 308 in the embodiment shown in FIG. 3, and details are not described herein again.

In a specific implementation, the third request message includes a fourth object field, a fourth operation field, and a fourth operation attribute field. For a specific implementation, refer to detailed descriptions in the embodiment shown in FIG. 6, and details are not described herein again.

In a specific implementation, in the third request message, the fourth object field includes the VLAN identifier, the fourth operation field includes information whose indication operation type is a fifth steering request, and the fourth operation attribute field includes the identifier of the target UP. For a specific implementation, refer to detailed descriptions in the embodiment shown in FIG. 6, and details are not described herein again.

In a specific implementation, in the third request message, the fourth object field includes the VLAN identifier, the fourth operation field includes information whose indication operation type is a sixth steering request, and the fourth operation attribute field includes the identifier of the target UP. For a specific implementation, refer to detailed descriptions in the embodiment shown in FIG. 6, and details are not described herein again.

It should be noted that for specific content such as an execution process of the SDN controller, refer to descriptions in the foregoing method embodiments of this application. Details are not described herein again.

In a specific implementation, the communication apparatus 1100 is configured to perform functions implemented by the SF 202 in FIG. 2, the SF in FIG. 3, and the SF 1000 in FIG. 10 in the foregoing embodiments. In addition, when the units in the embodiment shown in FIG. 10 are functional modules implemented by software, these software functional modules may be stored in the memory 1103. When the processor 1101 executes software code in the memory 1103, the SF is enabled to perform the following steps:

receiving a third request message from an SDN controller, where the third request message includes an identifier of an end user and an identifier of a target UP; for a specific implementation, refer to detailed descriptions of step 308 in the embodiment shown in FIG. 3, and details are not described herein again; and processing a connection between the end user and the target UP based on the third request message; for a specific implementation, refer to detailed descriptions of step 309 in the embodiment shown in FIG. 3, and details are not described herein again.

In a specific implementation, the third request message includes a fourth object field, a fourth operation field, and a fourth operation attribute field. For a specific implementation, refer to detailed descriptions in the embodiment shown in FIG. 6, and details are not described herein again.

In a specific implementation, in the third request message, the fourth object field includes a VLAN identifier, the fourth operation field includes information whose indication operation type is a fifth steering request, and the fourth operation attribute field includes the identifier of the target UP. For a specific implementation, refer to detailed descriptions in the embodiment shown in FIG. 6, and details are not described herein again.

In a specific implementation, in the third request message, the fourth object field includes a VLAN identifier, the fourth operation field includes information whose indication operation type is a sixth steering request, and the fourth operation attribute field includes the identifier of the target UP. For a specific implementation, refer to detailed descriptions in the embodiment shown in FIG. 6, and details are not described herein again.

It should be noted that for specific content such as an execution process of the SF, refer to descriptions in the foregoing method embodiments of this application. Details are not described herein again.

In addition, the processor 1101 may be a central processing unit, a general-purpose processor, a digital signal processor, an application-specific integrated circuit, a field programmable gate array or another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. A person skilled in the art may clearly understand that, for the purpose of convenient and brief description, for detailed working processes of the foregoing system, apparatuses, and units, refer to corresponding processes in the foregoing method embodiments. Details are not described herein again.

Figure 12:
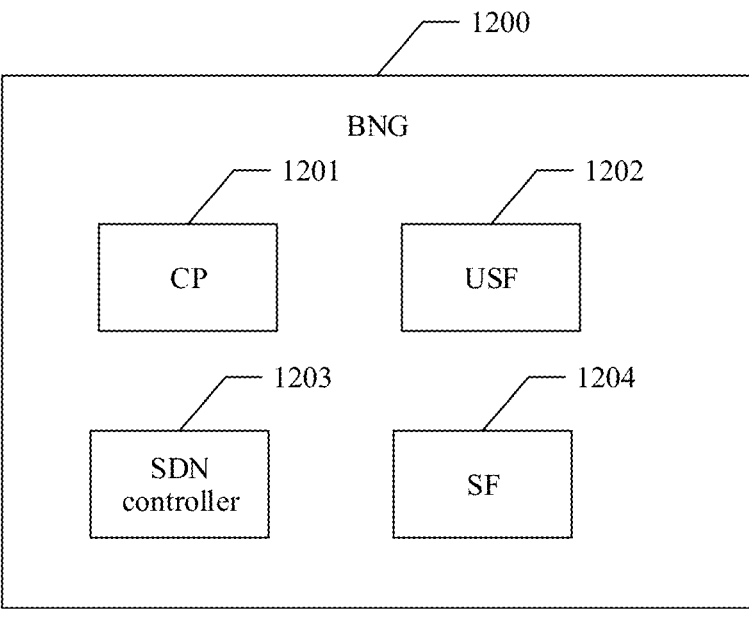
FIG. 12 is a schematic diagram of an embodiment of a broadband network gateway BNG according to an embodiment of this application.

FIG. 12 is a schematic diagram of a specific logical structure of a broadband network gateway BNG 1200 in the foregoing embodiments according to an embodiment of this application. The broadband network gateway BNG 1200 may include but is not limited to a control plane entity CP 1201 and a user plane steering function entity USF 1202. In a specific implementation, the BNG 1200 may further include an SDN controller 1203 and a steering function entity SF 1204. For specific implementations of the control plane entity CP 1201, the user plane steering function entity USF 1202, the SDN controller 1203, and the steering function entity SF 1204, refer to corresponding processes in the foregoing method embodiments. Details are not described herein again.

A person skilled in the art may clearly understand that, for the purpose of convenient and brief description, for detailed working processes of the foregoing system, apparatuses, and units, refer to corresponding processes in the foregoing method embodiments. Details are not described herein again.

An embodiment of this application further provides a computer-readable storage medium storing one or more computer-executable instructions. When the computer-executable instructions are executed by a processor, the processor performs the method according to any specific implementation of the foregoing method embodiments.

An embodiment of this application further provides a computer program product storing one or more computer-executable instructions. When the computer-executable instructions are executed by a processor, the processor performs the method according to any specific implementation of the foregoing method embodiments.

This application further provides a chip system. The chip system includes a processor. The processor may include a baseband processor (BP). For example, the processor may further include an application processor (AP). The processor is configured to support the communication apparatus to implement a function in any specific implementation of the foregoing method embodiments. In a specific design, the chip system may further include a memory. The memory is configured to store necessary program instructions and data. The chip system may include a chip, or may include a chip and another discrete component.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A network device, applied to a control plane (CP), in a broadband network gateway (BNG) system having a user plane steering function (USF) and a software-defined network (SDN) controller, comprising:

at least one processor;

one or more memories coupled to the at least one processor and storing programming instructions, wherein the at least one processor is configured to execute the programming instructions to cause the CP in the BNG system to:

send a first message to the USF in the BNG system, wherein the first message comprises end user information, and the end user information comprises user access information and service level agreement (SLA) information;

receive a first request message from the USF in the BNG system, wherein the first request message comprises an identifier of a target user plane (UP) from multiple UPs managed by the CP, and the target UP is associated with an end user; and process a connection between the end user and the target UP based on the identifier of the target UP, wherein a virtual local area network (VLAN) identifier of the end user and an identifier of a target steering function (SF) associated with the end user are determined based on the first message, and a second request message that includes the VLAN identifier, the identifier of the target SF, and the identifier of the target UP is sent to the SDN controller in the BNG system.

2. The network device according to claim 1, wherein the first message comprises a first object field, a first operation field, and a first operation attribute field; and the first request message comprises a second object field, a second operation field, and a second operation attribute field.

3. The network device according to claim 2, wherein in the first message, the first object field comprises the user access information and the SLA information, the SLA information comprises initial SLA information, and the first operation field comprises information whose indication operation type is user online; and in the first request message, the second object field comprises the user access information, the second operation field comprises information whose indication operation type is a first steering request, and the second operation attribute field comprises the identifier of the target UP.

4. The network device according to claim 2, wherein in the first message, the first object field comprises the user access information and the SLA information, the SLA information comprises SLA update information, and the first operation field comprises information whose indication operation type is user SLA update; and in the first request message, the second object field comprises the user access information, the second operation field comprises information whose indication operation type is a second steering request, and the second operation attribute field comprises the identifier of the target UP.

5. The network device according to claim 1, wherein the user access information comprises a steering function (SF) identity (ID), QinQ information, and an initial user plane (UP) ID.

6. The network device according to claim 5, wherein the user access information further comprises at least one of the following:
    network segment information, a group UP ID, or an access interface ID.

7. A network device, applied to a user plane steering function (USF), in a broadband network gateway (BNG) system having a control plane (CP) and a software-defined network (SDN) controller, comprising:
    at least one processor;
    one or more memories coupled to the at least one processor and storing programming instructions, wherein the at least one processor is configured to execute the programming instructions to cause the USF in the BNG system to:
    receive a first message from the CP in the BNG system, wherein the first message comprises end user information, and the end user information comprises user access information and service level agreement (SLA) information;
    determine a target user plane (UP) associated with an end user based on the first message, wherein the target UP is determined from multiple UPs managed by the CP in the BNG system;
    send a first request message to the CP, wherein the first request message comprises an identifier of the target UP:
    determine an identifier of a target steering function (SF) associated with the end user and a virtual local area network (VLAN) identifier of the end user based on the first message; and
    send a second request message to the SDN controller in the BNG system, wherein the second request message includes the VLAN identifier, the identifier of the target SF, and the identifier of the target UP.

8. The network device according to claim 7, wherein first message comprises a first object field, a first operation field, and a first operation attribute field; and
    the first request message comprises a second object field, a second operation field, and a second operation attribute field.

9. The network device according to claim 8, wherein
    in the first message, the first object field comprises the user access information and the SLA information, the SLA information comprises initial SLA information, and the first operation field comprises information whose indication operation type is user online, and
    in the first request message, the second object field comprises the user access information, the second operation field comprises information whose indication operation type is a first steering request, and the second operation attribute field comprises the identifier of the target UP.

10. The network device according to claim 8, wherein
    in the first message, the first object field comprises the user access information and the SLA information, the SLA information comprises SLA update information, and the first operation field comprises information whose indication operation type is user SLA update, and
    in the first request message, the second object field comprises the user access information, the second operation field comprises information whose indication operation type is a second steering request, and the second operation attribute field comprises the identifier of the target UP.

11. The network device according to claim 7, wherein the user access information comprises a steering function (SF) identity (ID), media access control (MAC) layer information, QinQ information, and an initial user plane (UP) ID.

12. The network device according to claim 11, wherein the user access information further comprises at least one of the following:
    network segment information, a group UP ID, and an access interface ID.

13. The network device according to claim 7, wherein the second request message comprises a third object field, a third operation field, and a third operation attribute field.

14. The network device according to claim 13, wherein
    in the second request message, the third object field comprises the VLAN identifier, the third operation field comprises information whose indication operation type is a third steering request, and the third operation attribute field comprises the identifier of the target SF and the identifier of the target UP.

15. The network device according to claim 13, wherein
    in the second request message, the third object field comprises the VLAN identifier, the third operation field comprises information whose indication operation type is a fourth steering request, and the third operation attribute field comprises the identifier of the target SF and the identifier of the target UP.

16. A broadband network gateway (BNG) system, comprising:
    a control plane (CP) configured to manage multiple user planes (UPs);
    a user plane steering function (USF); and
    a software-defined network (SDN) controller,
    wherein the CP is configured to:
    send a first message to the USF, wherein the first message comprises end user information, and the end user information comprises user access information and service level agreement (SLA) information;
    receive a first request message from the USF, wherein the first request message comprises an identifier of a target user plane (UP), and the target UP is associated with an end user, and the target UP is determined from multiple UPs managed by the CP; and
    process a connection between the end user and the target UP based on the identifier of the target UP, and
    wherein the USF is configured to:
    receive the first message from the CP;
    determine the target UP associated with an end user based on the first message, wherein the target UP is determined from multiple UPs managed by the CP;
    send the first request message to the CP;
    determine an identifier of a target steering function (SF) associated with the end user and a virtual local area network (VLAN) identifier of the end user based on the first message; and
    send a second request message to the SDN controller, wherein the second request message comprises the VLAN identifier, the identifier of the target SF, and the identifier of the target UP.

17. The BNG system according to claim 16, wherein the first message comprises a first object field, a first operation field, and a first operation attribute field; and the first request message comprises a second object field, a second operation field, and a second operation attribute field.

18. The BNG system according to claim 17, wherein in the first message, the first object field comprises the user access information and the SLA information, the SLA information comprises initial SLA information, and the first operation field comprises information whose indication operation type is user online, and in the first request message, the second object field comprises the user access information, the second operation field comprises information whose indication operation type is a first steering request, and the second operation attribute field comprises the identifier of the target UP.

19. The BNG system according to claim 17, wherein in the first message, the first object field comprises the user access information and the SLA information, the SLA information comprises SLA update information, and the first operation field comprises information whose indication operation type is user SLA update, and in the first request message, the second object field comprises the user access information, the second operation field comprises information whose indication operation type is a second steering request, and the second operation attribute field comprises the identifier of the target UP.

\*   \*   \*   \*   \*